(12) United States Patent
Beard et al.

(10) Patent No.: US 9,311,331 B2
(45) Date of Patent: Apr. 12, 2016

(54) DETECTING OUT-OF-BAND (OOB) CHANGES WHEN REPLICATING A SOURCE FILE SYSTEM USING AN IN-LINE SYSTEM

(71) Applicant: NetApp, Inc., Sunnyvale, CA (US)

(72) Inventors: Derek Beard, Austin, TX (US);
Duen-Wen Hsiao, Austin, TX (US);
Ghassan Yammine, Leander, TX (US)

(73) Assignee: NetApp, Inc., Sunnyvale, CA (US)

( * ) Notice: Subject to any disclaimer, the term of this patent is extended or adjusted under 35 U.S.C. 154(b) by 187 days.

(21) Appl. No.: 14/011,718

(22) Filed: Aug. 27, 2013

(65) Prior Publication Data

US 2015/0066852 A1 Mar. 5, 2015

(51) Int. Cl.
*G06F 17/30* (2006.01)

(52) U.S. Cl.
CPC .... *G06F 17/30212* (2013.01); *G06F 17/30079* (2013.01)

(58) Field of Classification Search
CPC .......... G06F 17/30174; G06F 17/3007; G06F 17/30079; G06F 12/0875; G06F 17/30578; G06F 17/30194; G06F 11/0709; G06F 3/0688; G06F 3/065; G06F 3/0604; G06F 12/0891; G06F 11/2071; G06F 11/2064; G06F 3/067; G06F 11/2058; G06F 11/2069; G06F 11/2074; G06F 11/2082; G06F 11/1451; G06F 11/1464; G06F 11/1469; G06F 11/1471; G06F 2201/82; H04L 67/2823; H04L 29/08801; H04L 29/08549; H04L 63/20
USPC ......... 707/625, 657, 637, 639, 640, 649, 692, 707/827, 613, 661, 610, 822, E17.01, 707/E17.002, E17.032, E17.005; 711/100, 711/103, 122, 123, 135, 141, 154, 156, 162, 711/171, E12.002; 709/203, 205, 213, 216, 709/217, 218, 219, 220, 226, 229, 230, 232, 709/239
See application file for complete search history.

(56) References Cited

U.S. PATENT DOCUMENTS

| 5,432,912 | A | | 7/1995 | Kihara |
| 5,592,611 | A | * | 1/1997 | Midgely et al. ................. 714/4.3 |
| 5,710,885 | A | | 1/1998 | Bondi |
| 5,893,140 | A | | 4/1999 | Vahalia et al. |
| 5,937,406 | A | * | 8/1999 | Balabine ........... G06F 17/30067 707/E17.01 |
| 6,324,581 | B1 | * | 11/2001 | Xu et al. ........................ 709/229 |
| 6,401,093 | B1 | * | 6/2002 | Anand et al. .......... 707/E17.007 |

(Continued)

FOREIGN PATENT DOCUMENTS

WO WO-2013/022582 A2 2/2013

OTHER PUBLICATIONS

Li, J.;—Hewlett-Packard Labs. (HP Labs.), Palo Alto, CA, USA—; Singhal, S.; Swaminathan, R.; and Karp, A.H.—"Managing Data Retention Policies at Scale"—Published in: Network and Service Management, IEEE Transactions on (vol. 9 , Issue: 4 ); pp. 393-406; Oct. 19, 2012; Browse Journals & Magazines Network & Service Man.*

(Continued)

*Primary Examiner* — Anh Ly
(74) *Attorney, Agent, or Firm* — Mahamedi Paradice LLP

(57) ABSTRACT

Examples described herein include a computer system, positioned in-line with respect to a plurality of clients that actively use a source file system, to replicate a source file system on a target memory in presence of out-of-band events which alter the source file system.

12 Claims, 15 Drawing Sheets

(56) References Cited

U.S. PATENT DOCUMENTS

| | | | |
|---|---|---|---|
| 6,658,540 B1 | 12/2003 | Sicola et al. | |
| 6,938,039 B1* | 8/2005 | Bober | G06F 17/30079 |
| | | | 707/704 |
| 7,035,907 B1 | 4/2006 | DeCasper et al. | |
| 7,069,278 B2 | 6/2006 | Telkowski et al. | |
| 7,149,858 B1 | 12/2006 | Kiselev | |
| 7,203,731 B1 | 4/2007 | Coates et al. | |
| 7,444,335 B1* | 10/2008 | Colrain et al. | 709/220 |
| 7,571,168 B2 | 8/2009 | Bahar et al. | |
| 7,574,443 B2 | 8/2009 | Bahar et al. | |
| 7,603,372 B1 | 10/2009 | Honicky et al. | |
| 7,653,699 B1 | 1/2010 | Colgrove et al. | |
| 7,698,306 B2 | 4/2010 | Watanabe et al. | |
| 7,769,723 B2 | 8/2010 | Zheng et al. | |
| 7,844,584 B1 | 11/2010 | Griess | |
| 7,925,629 B2 | 4/2011 | Webman et al. | |
| 7,953,819 B2 | 5/2011 | Liang et al. | |
| 8,117,244 B2 | 2/2012 | Marinov et al. | |
| 8,281,360 B2 | 10/2012 | Flewallen et al. | |
| 8,285,817 B1 | 10/2012 | Balasubramanian et al. | |
| 8,346,966 B1 | 1/2013 | Phatak et al. | |
| 8,452,856 B1 | 5/2013 | Lent et al. | |
| 8,484,164 B1 | 7/2013 | Sivakumar et al. | |
| 8,655,848 B1 | 2/2014 | Leverett et al. | |
| 8,676,980 B2 | 3/2014 | Kreeger et al. | |
| 2002/0032751 A1 | 3/2002 | Bharadwaj | |
| 2002/0059451 A1 | 5/2002 | Haviv | |
| 2002/0078174 A1 | 6/2002 | Sim et al. | |
| 2002/0124079 A1 | 9/2002 | Pulsipher | |
| 2002/0133491 A1 | 9/2002 | Sim et al. | |
| 2002/0143984 A1 | 10/2002 | Hudson et al. | |
| 2002/0156613 A1 | 10/2002 | Geng et al. | |
| 2002/0174194 A1 | 11/2002 | Mooney et al. | |
| 2003/0009480 A1 | 1/2003 | Lin et al. | |
| 2003/0028514 A1 | 2/2003 | Lord et al. | |
| 2003/0078946 A1* | 4/2003 | Costello et al. | 707/201 |
| 2003/0097454 A1 | 5/2003 | Yamakawa et al. | |
| 2003/0158862 A1 | 8/2003 | Eshel | |
| 2003/0177107 A1 | 9/2003 | Brown et al. | |
| 2003/0182313 A1 | 9/2003 | Federwisch et al. | |
| 2004/0049702 A1 | 3/2004 | Subramaniam et al. | |
| 2004/0054850 A1* | 3/2004 | Fisk | 711/112 |
| 2004/0078467 A1* | 4/2004 | Grosner et al. | 709/226 |
| 2004/0123154 A1 | 6/2004 | Lippman et al. | |
| 2004/0250113 A1* | 12/2004 | Beck | 713/201 |
| 2005/0010838 A1 | 1/2005 | Davies et al. | |
| 2005/0075856 A1 | 4/2005 | Wozniak et al. | |
| 2005/0125503 A1 | 6/2005 | Iyengar et al. | |
| 2005/0193245 A1 | 9/2005 | Hayden et al. | |
| 2006/0004765 A1 | 1/2006 | Anderson et al. | |
| 2006/0015507 A1 | 1/2006 | Butterworth et al. | |
| 2006/0015584 A1 | 1/2006 | Ocko et al. | |
| 2006/0064474 A1 | 3/2006 | Feinleib et al. | |
| 2006/0179037 A1* | 8/2006 | Turner | G06F 17/30067 |
| | | | 707/E17.01 |
| 2006/0206603 A1 | 9/2006 | Rajan et al. | |
| 2006/0212481 A1 | 9/2006 | Stacey et al. | |
| 2007/0022087 A1* | 1/2007 | Bahar | G06F 9/5011 |
| | | | 707/E17.01 |
| 2007/0022121 A1* | 1/2007 | Bahar | G06F 9/5011 |
| | | | 707/615 |
| 2007/0022129 A1* | 1/2007 | Bahar | G06F 9/5011 |
| | | | 707/E17.01 |
| 2007/0038697 A1 | 2/2007 | Zimran et al. | |
| 2007/0055703 A1 | 3/2007 | Zimran et al. | |
| 2007/0083570 A1* | 4/2007 | Fineberg | 707/203 |
| 2007/0088702 A1* | 4/2007 | Fridella et al. | 707/10 |
| 2007/0094354 A1 | 4/2007 | Soltis | |
| 2007/0156989 A1 | 7/2007 | Man et al. | |
| 2007/0168046 A1 | 7/2007 | Misawa et al. | |
| 2008/0010411 A1 | 1/2008 | Yang et al. | |
| 2008/0040385 A1 | 2/2008 | Barrall et al. | |
| 2008/0281908 A1* | 11/2008 | McCanne et al. | 709/203 |
| 2008/0294748 A1 | 11/2008 | Brown et al. | |
| 2009/0043823 A1 | 2/2009 | Iftode et al. | |
| 2009/0067440 A1* | 3/2009 | Chadda et al. | 370/401 |
| 2009/0150593 A1 | 6/2009 | Hamilton et al. | |
| 2009/0182835 A1* | 7/2009 | Aviles et al. | 709/213 |
| 2009/0182836 A1 | 7/2009 | Aviles et al. | |
| 2009/0182945 A1 | 7/2009 | Aviles et al. | |
| 2009/0222509 A1* | 9/2009 | King et al. | 709/203 |
| 2009/0240784 A1 | 9/2009 | Soltis | |
| 2009/0271412 A1* | 10/2009 | Lacapra et al. | 707/10 |
| 2009/0300739 A1 | 12/2009 | Nice et al. | |
| 2010/0023674 A1* | 1/2010 | Aviles | 711/103 |
| 2010/0082774 A1 | 4/2010 | Pitts | |
| 2010/0083675 A1 | 4/2010 | Merritt | |
| 2010/0121945 A1 | 5/2010 | Gerber et al. | |
| 2010/0217869 A1 | 8/2010 | Esteban et al. | |
| 2010/0312861 A1 | 12/2010 | Kolhi et al. | |
| 2010/0332401 A1 | 12/2010 | Prahlad et al. | |
| 2011/0016085 A1* | 1/2011 | Kuo | G06F 17/30212 |
| | | | 707/615 |
| 2011/0022812 A1* | 1/2011 | van der Linden et al. | 711/163 |
| 2011/0066668 A1* | 3/2011 | Guarraci | 707/831 |
| 2011/0184907 A1 | 7/2011 | Schrock et al. | |
| 2011/0196842 A1 | 8/2011 | Timashev et al. | |
| 2011/0320436 A1 | 12/2011 | Hokanson | |
| 2012/0005193 A1* | 1/2012 | Nemoto | G06F 9/5072 |
| | | | 707/722 |
| 2012/0011176 A1* | 1/2012 | Aizman | 707/E17.032 |
| 2012/0016838 A1* | 1/2012 | Arai et al. | 707/610 |
| 2012/0041829 A1 | 2/2012 | Rothschild et al. | |
| 2012/0059864 A1 | 3/2012 | Bandyopadhyay et al. | |
| 2012/0117328 A1 | 5/2012 | McKean et al. | |
| 2012/0150799 A1 | 6/2012 | Matsuzawa | |
| 2012/0324110 A1 | 12/2012 | Kohli | |
| 2013/0019301 A1 | 1/2013 | Reddy et al. | |
| 2013/0054530 A1 | 2/2013 | Baker et al. | |
| 2013/0097680 A1 | 4/2013 | Bendapudi et al. | |
| 2013/0132544 A1 | 5/2013 | Krishnan et al. | |
| 2013/0155902 A1 | 6/2013 | Feng et al. | |
| 2013/0227048 A1 | 8/2013 | Xie et al. | |
| 2013/0322298 A1 | 12/2013 | Alexander, Jr. et al. | |
| 2013/0325804 A1* | 12/2013 | Bachar et al. | 707/634 |
| 2013/0339547 A1 | 12/2013 | Nath et al. | |
| 2014/0052812 A1 | 2/2014 | Ozawa | |
| 2014/0129667 A1 | 5/2014 | Ozawa | |
| 2014/0165176 A1 | 6/2014 | Ow | |
| 2014/0298454 A1 | 10/2014 | Heng et al. | |
| 2015/0020059 A1 | 1/2015 | Davis | |
| 2015/0207872 A1 | 7/2015 | Stiemerling et al. | |

OTHER PUBLICATIONS

Reed, B.C.; IBM Almaden Res. Center, San Jose, CA, USA ; Smith, M.A. ; Diklic, D.—"Security considerations when designing a distributed file system using object storage devices" Published in: Security in Storage Workshop, 2002. Proceedings. First International IEEE; Date of Conference: Dec. 11, 2002; pp. 24-34.*

International Search Report and Written Opinion, mailed Dec. 11, 2014, for related application PCT/US2014/053011, filed Aug. 27, 2014, 10pages.

Office Action mailed Feb. 11, 2015, for related U.S. Appl. No. 14/011,723, filed Aug. 27, 2013, 15 pages.

D. Bossen, J. Tendler, K. Reick, "Power4 System Design for High Reliability," IEEE Micro Magazine, vol. 22, No. 2, pp. 16-24, Mar.-Apr. 2002.

Pawlowski, B. et al., NFS version 3: Design and implementation. In Proceedings of the Summer 1994 USENIX Technical Conference, 15 pages, pp. 137-151, 1994. Retrieved from the Internet http://people.cs.pitt.edu/-manas/courses/251O/nfs3.pdf.

Office Action mailed May 12, 2012, for related U.S. Appl. No. 14/011,699, filed Aug. 27, 2013, 27 pages.

Office Action mailed Aug. 28, 2015, for related U.S. Appl. No. 14/011,699, filed Aug. 27, 2013, 26 pages.

Office Action mailed Jun. 18, 2015, for related U.S. Appl. No. 14/011,696, filed Aug. 27, 2013, 25 pages.

Office Action mailed Jun. 18, 2015 for related U.S. Appl. No. 14/011,719, filed Aug. 27, 2013, 18 pages.

Office Action mailed Jul. 8, 2015, for related U.S. Appl. No. 14/011,723, filed Aug. 27, 2013, 13 pages.

(56) References Cited

OTHER PUBLICATIONS

Microsoft Press, 2002. Microsoft Computer Dictionary, Fifth Edition (5th ed.). p. 348, Microsoft Press, Redmond, WA, USA.
Office Action mailed Aug. 19, 2015, for related U.S. Appl. No. 14/031,023, filed Sep. 18, 2013, 32 pages.
Office Action mailed Apr. 9, 2015, for related U.S. Appl. No. 14/031,023, filed Sep. 18, 2013, 29 pages.
Office Action mailed Apr. 24, 2015, for related U.S. Appl. No. 14/031,026, filed Sep. 18, 2013, 30 pages.
Office Action mailed Aug. 20, 2015, for related U.S. Appl. No. 14/031,026, filed Sep. 18, 2013, 27 pages.
You I., "On Asynchronous Enforcement of Security Policies in "Nomadic" Storage Facilities," Published in: Industrial Electronics (ISIE), 2013 IEEE International Symposium on, May 28-31, 2013, pp. 1-6.
Non-Final Office Action mailed Nov. 20, 2015 for U.S. Appl. No. 14/031,018 filed Sep. 18, 2013, 28 pages.
Non-Final Office Action mailed on Dec. 17, 2015 for U.S. Appl. No. 14/031,019 filed Sep. 18, 2013, 31 pages.
Veeraraghavan K., et al., "DoublePlay: Parallelizing Sequential Logging and Replay," Journal ACM Transactions Computer Systems (TOGS), Special Issue APLOS 2011 TOGS Homepage archive, vol. 30 (1), Feb. 2012, pp. 3:1-3:24.
Notice of Allowance mailed Dec. 15, 2015 for U.S. Appl. No. 14/011,719 filed Aug. 27, 2013, 14 pages.
Notice of Allowance mailed Dec. 3, 2015 for U.S. Appl. No. 14/011,696 filed Aug. 27, 2013, 15 pages.
Notice of Allowance mailed Nov. 6, 2015 for U.S. Appl. No. 14/011,723 filed Aug. 27, 2013, 11 pages.

* cited by examiner

DETECTING OUT-OF-BAND (OOB) CHANGES WHEN REPLICATING A SOURCE FILE SYSTEM USING AN IN-LINE SYSTEM

TECHNICAL FIELD

Examples described herein relate to a system and method for detecting out-of-band changes when replicating a source file system using an in-line system.

BACKGROUND

Network-based file systems include distributed file systems which use network protocols to regulate access to data. Network File System (NFS) protocol is one example of a protocol for regulating access to data stored with a network-based file system. The specification for the NFS protocol has had numerous iterations, with recent versions NFS version 3 (1995) (See e.g., RFC 1813) and version 4 (2000) (See e.g., RFC 3010). In general terms, the NFS protocol allows a user on a client terminal to access files over a network in a manner similar to how local files are accessed. The NFS protocol uses the Open Network Computing Remote Procedure Call (ONC RPC) to implement various file access operations over a network.

Other examples of remote file access protocols for use with network-based file systems include the Server Message Block (SMB), Apple Filing Protocol (AFP), and NetWare Core Protocol (NCP). Generally, such protocols support synchronous message-based communications amongst programmatic components.

DETAILED DESCRIPTION

Figure 1A:
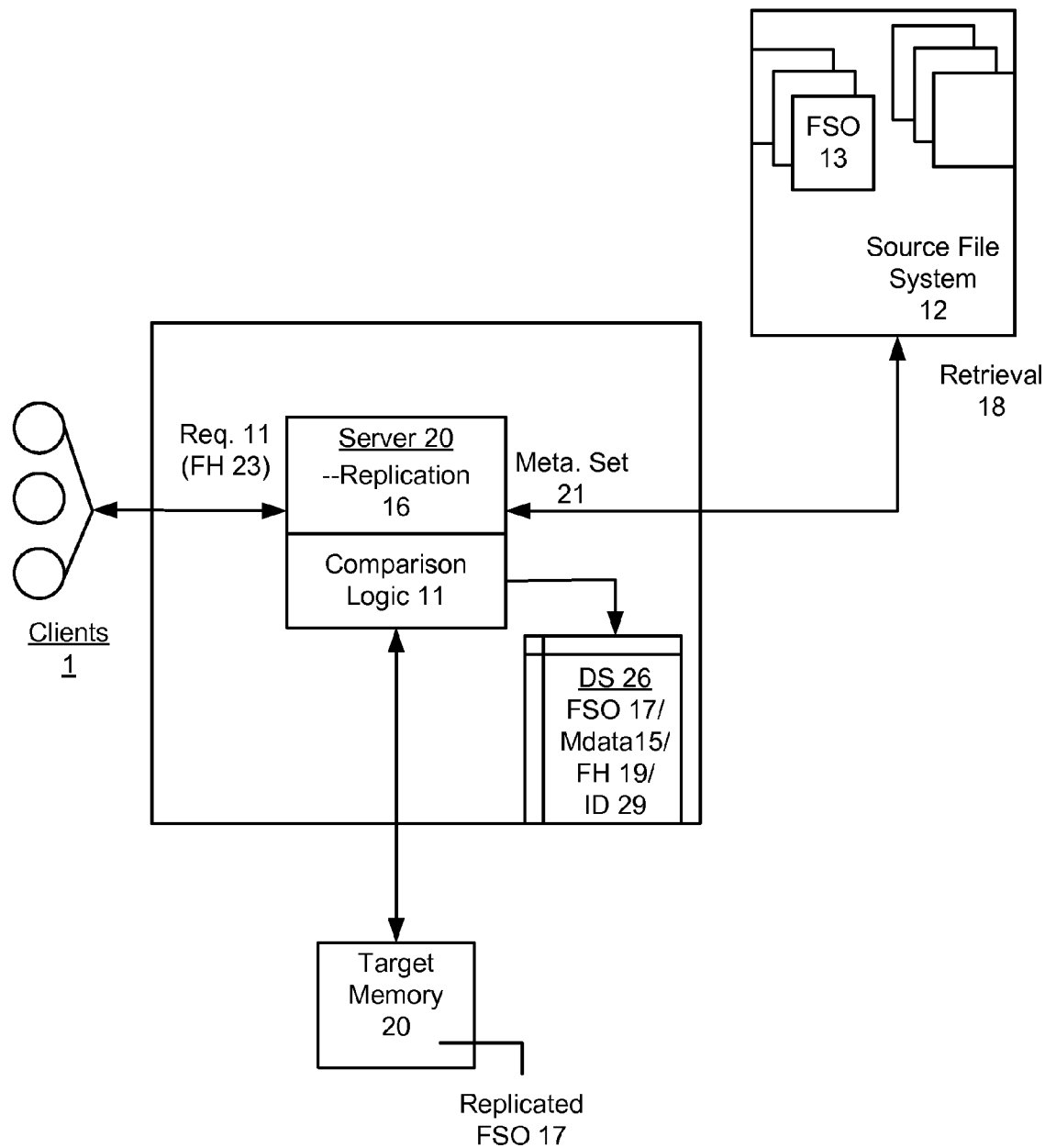
FIG. 1A illustrates a system for detecting out-of-band changes when replicating a source file system, according to an embodiment.

Examples described herein include a computer system, positioned in-line with respect to a plurality of clients that actively use a source file system, to replicate a source file system on a target memory in presence of out-of-band events which may alter the source file system.

In an embodiment, a computer system performs operations that include populating a target memory with data corresponding to file system objects of the source file system. The computer system also handles requests from individual clients in the plurality of clients for file system objects of the source filer. In handling the requests, the computer system performs operations that include determining whether a file handle specified in a given request from a client identifies a file system object on the source file system that has a counterpart stored in the target memory. The determination can include determining whether the file handle specified in the given request identifies a first file system object on the source file system and a second file system object that is not the counterpart to the first file system object stored in the target memory. In response to determining that the file handle specified in the given request identifies the first file system object on the source file system and the second file system object in the target memory, the server removes the second file system object from the target memory and stores, in the target memory, the first file system object in association with the file handle specified in the given request.

A computer system includes one or more processors to replicate at least a portion of the source file system on a target memory, and to handle requests from individual clients for file system objects of the source file system. In handling requests, the one or more processors identify a file handle specified in a given request from one of the plurality of clients, and retrieve, from the source file system, a set of metadata associated with the specified file handle. From the set of metadata, the one or more processors determine whether an unrecorded change occurred on the source file system in connection with the specified file handle. The unrecorded change can correspond to at least one of (i) an update to a file system object for which a corresponding file system object exists in the target memory, where the update to the file system object is not reflected in the corresponding file system object. The unrecorded change can also correspond to a change in the file system object identified by the file handle at the source file system, as compared to the file system object identified by the file handle at the target memory. The computer system can update the target memory to record the change in connection with the specified file handle, so that the target memory is consistent with the source file system.

In still another embodiment, at least a portion of the source file system is replicated on a target memory while the source file system is in active use by a plurality of clients. Requests from individual clients for file system objects of the source file system can be received and handled by (i) identifying a file handle in the individual requests, (ii) retrieving, from the source file system, a set of metadata associated with the specified file handle, (iii) determining, from the set of metadata, that the file handle identifies a first file system object on the source filer and a second file system object on the target memory, and (iv) updating the target memory so that the file handle identifies the first file system object.

Still further, some embodiments described herein include a system for migrating data from a source file system to a destination file system, in a manner that is transparent and seamless to clients of the source file system.

In an embodiment, a data migration system includes a server positioned in-line as between a plurality of clients and the source file system. The server transparently inserts in-line to receive and forward communications as between the source file system and individual clients of the source file system. While clients in the plurality of clients request use of the source file system, the server implements processes to replicate each file system object that is part of the source file system with the destination file system. In response to a client request that alters the source file system, the server can operate to (i) forward a response from the source file system to the requesting client, and (ii) queue a file system operation specified by the corresponding request, for performance at the destination file system after the response from the source file system has been forwarded to the one of the plurality of clients.

In another embodiment, file system objects that comprise a source file system can be replicated on a destination file system while the source file system handles file system operations from a plurality of clients that are mounted to the source file system. When the source file system and the destination file system are deemed to not be equivalent, a server asynchronously implements, on the destination file system, those file system operations that affect the source file system. Once the source file system and the destination file system are programmatically deemed equivalent, file system operations that affect the source file system are implemented synchronously on the destination file system. Each of the plurality of clients can then transition from utilizing the source file system to using the destination file system.

Still further, in some embodiments, a data migration system that operates to migrate data from a source file system to a destination file system. Among the operations performed, the data migration system identifies a collection of file system objects that are associated with a source file system in active use by a plurality of clients. Individual file system operations that are intended to be handled by the source file system are intercepted at a location that is in-line and external to the source file system. The data migration system replicates each file system object of the collection at a destination file system. When individual file system operations are determined to alter the source file system, the data migration system asynchronously implements the one or more of the individual file system operations on the destination file system.

Still further, in some embodiments, a data migration system can implement a series of file system operations in order to traverse a source file system and identify file system objects that comprise the source file system. A data structure is maintained in which each identified file system object is associated with an entry and a current set of attributes for that file system object. Each identified file system object is created and maintained on a destination file system. Individual file system operations that are generated from clients for the source file system are intercepted at a node that is in-line and external to the source file system. A corresponding file system object specified by each of the file system operations is identified. A determination is made from the data structure as to whether the corresponding file system object has previously been identified. If the corresponding file system object has not previously been identified, then (i) determining a set of attributes for the corresponding file system object, (ii) adding an entry for the corresponding file system object and its set of attributes on the data structure, and (iii) replicating the corresponding data object at the destination file system.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component can exist in a hardware component independently of other modules/components or a module/component can be a shared element or process of other modules/components, programs or machines. A module or component may reside on one machine, such as on a client or on a server, or may alternatively be distributed among multiple machines, such as on multiple clients or server machines. Any system described may be implemented in whole or in part on a server, or as part of a network service. Alternatively, a system such as described herein may be implemented on a local computer or terminal, in whole or in part. In either case, implementation of a system may use memory, processors and network resources (including data ports and signal lines (optical, electrical etc.)), unless stated otherwise.

Furthermore, one or more embodiments described herein may be implemented through the use of instructions that are executable by one or more processors. These instructions may be carried on a non-transitory computer-readable medium. Machines shown in figures below provide examples of processing resources and non-transitory computer-readable mediums on which instructions for implementing one or more embodiments can be executed and/or carried. For example, a machine shown for one or more embodiments includes processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and tablets) and magnetic memory. Computers, terminals, and network-enabled devices (e.g. portable devices such as cell phones) are all examples of machines and devices that use processors, memory, and instructions stored on computer-readable mediums.

System Overview

FIG. 1A illustrates a system for detecting out-of-band changes when replicating a source file system, according to an embodiment. In some embodiments, a system 10 is implemented using one or more servers 20 that are positioned in-line with respect to clients 1 and a source file system ("source filer 12"). The source filer 12 can correspond to a network-based file system such as a distributed file system that is provided in a networked environment, under a protocol such as NFS Version 3 or Version 4. The source filer 12 can include logical components (e.g., controller) that structure distributed memory resources in accordance with a file system structure (e.g., directory-based hierarchy), as well process requests for file system objects 13 maintained as part of the source filer 12.

In an embodiment, the server 20 handles requests directed to the source filer 12 from clients 1, while implementing replication processes 16 to replicate at least a portion of the source filer 12 on a target memory 30. In some embodiments, the target memory 30 corresponds to a cache memory, and the server 20 implements the replication processes 16 in order to copy a portion of the source filer 12 into cache. For example, target memory 30 can be employed to cache at least the more frequently used file system objects of the source filer 12. In this way, the system 10 and target memory 30 can enhance the time of response to the clients 1 that make requests of the source filer 12. As an addition or variation, system 10 can be implemented as a data migration system which migrates data from the source filer 12 to a destination filer provided by the target memory 30. For example, as described with FIG. 1B, and FIG. 2A through FIG. 2E, target memory 30 can correspond to a combination of cache and memory resources for providing a destination filer onto which the source filer 12 is replicated. As still another example, the target memory 30 can correspond to memory that backs up or archives the source filer 12.

As a result of the replication processes 16, the target memory 30 stores data corresponding to the file system objects 13 of the source filer 12. The data stored by the server 20 can include a data store 36 which associates each replicated file system object 17 (as stored in target memory 30) with a corresponding metadata set 15, as well as with a corresponding file handle 19 that is in use for that file system object at the time the particular file system object is replicated. Thus, the stored metadata sets 15 can match or correlate to a corresponding metadata set for the file system object as provided though the source filer 12. Furthermore, in order to maintain an accurate replication, the server 20 intercepts requests 11 from clients 1 for the source filer 12. As described with, for example, FIG. 1B, those client requests 11 which modify the source filer 12 can be replicated on the target memory 30 so that the target memory accurately reflects the source filer 12. When file system objects 13 of the source filer 12 are modified, the metadata set 15 of the corresponding file system object stored in the target memory 30 is updated to correlate to the updated state of that file system object in the source filer 12.

While server 20 intercepts the client requests 11, embodiments recognize that out-of-band ("OOB") changes can occur to the source filer 12. Such OOB reflect changes made to the source filer 12 from events other than those client requests 11 which are intercepted and handled by the server 20. For example, in an NFS environment, the server 20 may be unable to process requests made in alternative protocols, such as File Transfer Protocol ("FTP"). Still further, other changes to the source filer 12 can result from physical or local manipulation to the resources of the source filer 12.

The server 20 can operate to detect OOB changes made to at least the portions of the source filer 12 which are replicated on the target memory 30. In an embodiment, each client request 11 handled by the server 20 specifies a file handle 23 which identifies, on the source filer 12, a corresponding file system object 13. Upon receiving the request, the server 20 signals a retrieval 18 from the source file 12 to obtain a set of metadata 21 for the file system object 13 identified by the file handle 22 of the client request 11. In the NFS environment, for example, the retrieval 18 can correspond to a "GetAttr" request from the source filer 12. Thus, for example, the server 20 executes the GetAttr request upon each incoming client request 11, or alternatively upon incoming client requests for which certain conditions are met (e.g., requests that specify replicated data from the target memory 30).

The server 20 can include comparison logic 22 which performs operations that include: (i) using the file handle of an incoming request 11 to identify a stored metadata set that is associated with the file handle and a corresponding file system object; (ii) retrieving a metadata set from the source filer 102 using the file handle of the incoming request 11; and (iii) comparing the retrieved metadata set 21 to the stored metadata set. For example, a comparison can be performed using the data store 26 in order to match the file handle 23 of the client request 11 against those file handles 19 that have been stored as a result of prior file system object replication and/or mirroring. When a match is found for the file handle 23 of the request 11 in the data store 26, a comparison can be performed between the stored metadata set 15 and the retrieved metadata set 21. In one implementation, the metadata comparison can determine whether the file system object 13 identified by the file handle 23 in the client request 11 was updated or changed on the source filer 12, without a corresponding change being made at the target memory 30. For example, the compared metadata can include change time (or C-Time), which is time stamp that, in the NFS environment, is updated each time any change is made to an attribute or content of a corresponding file system object. If the C-Time of the retrieved metadata set 21 indicates a more recent change than that reflected in the corresponding stored metadata set 15, then the server 20 can determine that a change occurred with respect to at least the file system object identified by the file handle 23 of the client request 11.

The compared metadata can also include modification time (or M-Time), which is time stamp that, in the NFS environment, is updated each time any change is made to a data content of a corresponding file system object. A change in the M-Time can signify, for example, an OOB write operation which modified the contents of the corresponding file system object.

The server 20 can associate a state with each replicated file system object 17 of the target memory 30. In one example, each replicated file system object can be associated with a state that corresponds to one of (i) valid, or (ii) suspect. If the state of the replicated file system object is deemed valid, the server 20 assumes the replicated file system object 17 is accurate as compared to a counterpart file system object provided by the source filer 12. The server 20 can, for example, determine that the file system object 17 is valid based on a comparison of the stored metadata set 15 associated with the file handle 19 of that file system object, and the retrieved metadata set 21 as returned from the source filer 12 when the request specifies the same file handle. In some implementations, for example, when a particular file system object is deemed valid, the target memory 30 can be used to provide a response to a corresponding client request 11. Use of the target memory 30 in this way can, for example, enhance performance when compared to the source filer 12.

If the file system object 17 is deemed to be suspect, the server 20 implements processes to obtain a valid state in the data that is stored in the target memory 30. In some implementations, this may correspond to the server 20 removing the suspect file system object 17 from the target memory 30, and replicating a new file system object in its place. In alternative implementations, the server 20 may check the source filer 12 to see if a discrepancy exists in the respective metadata sets, and if no discrepancy in fact exists, the state can be switched to valid. Still further, in some instances, the state of the file system object can be switched to valid by updating the file system object 17 to reflect a change in attribute or data as recorded on the source filer 12. For example, an OOB change to the file system object on the source filer 12 can be replicated when discovered by the server 20 on the target memory 30.

In some embodiments, the replicated file system object 17 of the target memory 30 can obtain a suspect state in response to some condition or event, such as the passage of time. For example, the server 20 can implement a lease time for each replicated file system object. If, for example, a replicated file system object has not been updated or checked for a given duration of time when a corresponding client request 11 for that object is received, then the particular file system object can be deemed suspect. If, however, the comparison of the metadata yields a result that indicates the replicated file system object is accurate, the state of that file system object can be switched to valid.

Embodiments further recognize that in some cases, when the replicated file system object 17 becomes suspect, the file handle 19 that is stored in the data store 26 can be re-assigned by the source filer 12. Such an occurrence is referenced herewith as the file handle being morphed by the source filer 12. The morphing of a file handle on the source filer 12 can be the result of an OOB event. For example, the source filer 12 (who is the authority for the file handle assignments) determines what file system object is identified by a given file handle. To further the example, a given file system object can be deleted from the source filer 12. In such instances, the source filer 12 may recycle an identifier that was previously used for the deleted file system object. The reuse of identifiers in this manner can result from an OOB event, in that the events may occur outside of the client requests 11 that are handled by the server 20. The server 20 can implement operations to detect such changes to identifiers, and further to update the target memory 30 so that the target memory is in sync with the source filer 12.

According to some embodiments, each replicated file system object is assigned an identifier that is internal to the server 20, so that the file system object can be uniquely identified on the server 20. The internal identifier of each file system object 17 can be determined based in part on the metadata set 15 associated with that object or its file handle. For example, as described with examples below, an object identifier or OID can be determined in part from the node identifier of the file system object, as maintained on the source filer 12. The data store 26 can associate such internal identifier 29 with the file handle 19 and stored metadata set 15 for each replicated file system object 17. In order to determine whether the file handle 19 of an otherwise suspect file system object has morphed, the retrieved metadata set 21 for that object is used to generate a temporary identifier that is internal to system 10. If the temporary internal identifier is present in the data store 26 so as to be associated with an existing file handle 19, then the server 20 determines that the file handle 19 of the suspect file system object 17 has not morphed. If, on the other hand, the temporary internal identifier is not present in the data store 26, so that no existing file handle 19 is associated with the identifier, then the determination of the server 20 is that the file handle has morphed. In such case, the server 20 may eliminate the prior replicated file system object and replicate the new file system object in association with the morphed file handle.

Data Migration Example

Figure 1B:
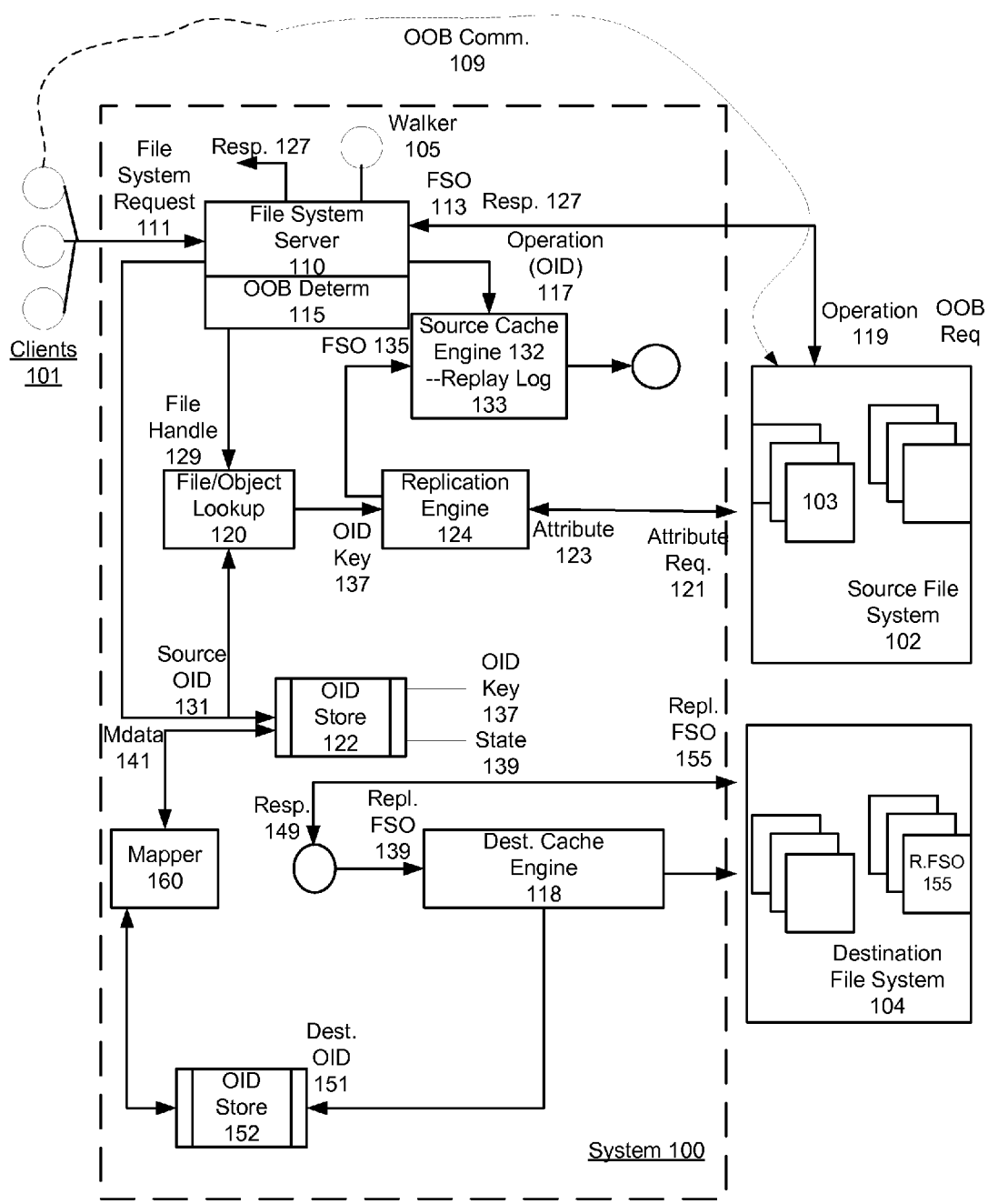
FIG. 1B illustrates a data migration system that is operable to migrate data from a network file system, according to one or more embodiments.

FIG. 1B illustrates a data migration system that is operable to migrate data from a network file system, without interrupting the ability of client terminals ("clients") to use the network file system, according to one or more embodiments. As shown by an example of a data migration system 100 operates to migrate data from a source filer 102 to a destination filer 104. Each of the source and destination filers 102, 104 can correspond to a network-based file system, such as those that utilize a protocol such as NFS Version 3 or Version 4. Each of the source and destination filers 102, 104 can include logical components (e.g., controller) that structure distributed memory resources in accordance with a file system structure (e.g., directory-based hierarchy), as well process requests for file system objects maintained as part of that file system.

In an example of FIG. 1B, data is migrated from the source filer 102 while the clients 101 are mounted to and actively using the source filer. More specifically, the data migration system 100 initiates and performs migration of data from the source filer 102 while clients 101 are mounted to the source filer. Among other benefits, the data migration system 100 can migrate the data from source filer 102 to the destination filer 104 in a manner that is transparent to the clients, without requiring the clients to first unmount and cease use of the source filer. By way of example, an administrator of a network environment may seek to migrate data from the source filer 102 to the destination filer 104 as a system upgrade for an enterprise network, without causing any significant interruption to the services and operation of the enterprise network.

According to some embodiments, the data migration system 100 is implemented through use of one or more in-line appliances and/or software. Accordingly, the data migration system 100 can be deployed on a computer network in position to intercept client requests 111 directed to source filer 102. The data migration system 100 can include processes that provide a data file server 110, as well as cache/memory resources (e.g., high-speed media) that enable queuing of operations and objects and caching of file system objects. In an example of FIG. 1, a transparent data migration system is deployed between the source filer 102 and the clients 101 while the clients actively use the source filer, without any network or reconfiguration of the endpoints. Among other benefits, the data migration system 100 operates independently, is self-contained, and installs in the network path between the clients and file servers.

With further reference to FIG. 1B, the data migration system 100 can be implemented by, for example computer hardware (e.g., network appliance, server etc.) that is positioned in-line with respect to a source filer that is to be migrated. In particular, the data migration system 100 can be positioned physically in line to intercept traffic between the clients and the source filer 102. Moreover, the data migration system 100 can provide a transparent virtualization of the source filer 102, so that the client terminals continue to issue requests for use of the source filer 102 for purpose of intercepting and proxying client/source filer exchanges. In implementation, the data migration system 100 can be operated to replicate the source filer to the destination filer 104 without requiring clients that are utilizing the source filer 102 to have to remount or otherwise interrupt use of the source filer.

In an embodiment, the transparency in the in-line insertion of the data migration system 100 is accomplished by configuring the data migration system to intercept and use traffic that is directed to the Internet Protocol (IP) address of the source filer 102. For example, an administrator of the network environment 10 can configure the data migration system 100 to utilize the IP addresses of the source filer 102, and further to forward traffic directed to the source filer after the traffic has been intercepted and processed. Moreover, return traffic directed from the source filer 102 to the clients 101 can be configured, through manipulation of the filer response, to appear as though the traffic is being communicated directly from the source filer. In this way, the data migration system 100 performs various replication processes to migrate the source filer 102 without disrupting the individual client's use of the source filer 102. As a result, the data migration system 100 is able to migrate data from the source filer 102, without interruption or performance loss to the clients 101.

In more detail, some embodiments provide for the data migration system 100 to include a data file server 110, a file/object lookup component 120, a replication engine 124 and a cache engine 132. The data migration system 100 can implement processes that initially populate the destination filer 104 asynchronously, while the clients actively use the source filer 102. Moreover, file system operations communicated from the clients 101 can be implemented asynchronously at the destination filer 104. The asynchronous nature of the replication and file system updates facilitates the ability of the data migration system 100 to eliminate or reduce latency and performance loss in respect to the client's use of the source filers. At some point when the source and destination filers 102, 104 are deemed equivalent, operations that affect file system objects of the source filer 102 can be replayed on the destination filer 104 in synchronized fashion. This allows for a subsequent stage, in which the destination filer 104 can be used in place of the source filer 102, in a manner that is transparent to the clients who have not yet unmounted from the source filer 102.

In an example of FIG. 1B, the file system server 110 fields file system requests 111 from clients 101 while the replication engine 124 implements replication processes that populate and update the destination filer 104. In one implementation, the file system server 110 receives and processes NFS (version 3) packets issued from clients 101. Other file system protocols can also be accommodated. The file system server 110 can include logical components that summarize the protocol-specific request (e.g., NFS request) before processing the request in a protocol-agnostic manner. The file system server 110 can also include logic that implement transactional guarantees for each NFS request. This logic can determine which NFS (or other protocol) requests are to be serialized, and which requests can be performed in parallel (e.g., read-type requests). The file system server 110 identifies file system objects for replication through either active or passive discovery. In active discovery, a system process (e.g., "walker 105") traverses the source filer 102 to determine the file system objects 103. In passive discovery, requests communicated from the clients 101 that utilize the source filer 102 are inspected in order to identify file system objects that need to be migrated or updated on the destination filer 104.

As the file system server 110 handles requests from clients 101, source cache engine 132 can cache file system objects and metadata of file system objects. The source cache engine 132 can implement a variety of algorithms to determine which file system objects to cache. For example, the source cache engine 132 can cache file system objects on discovery, and subsequently identify those file system objects that are more frequently requested. In some implementations, the metadata for the file system objects can be cached in a separate cache. Examples of metadata that can be cached include file handle, file size, C-time (change time) and M-time (modification time) attributes associated with individual file system objects (e.g., directories, folders, files).

In an example shown by FIG. 1B, the source cache engine 132 includes a replay logic 133. The replay logic 133 can be implemented as a component that replays operations for creating, modifying or deleting file system objects the destination filer 104. As described below, the replay logic 133 can be implemented in one or more instances in connection with operations performed to update or replicate on the source filer 102.

The replication engine 124 operates to implement file system operations that replicate file system objects of the source filer 102 and their existing states (as provided by the metadata) on the destination filer 104. As described below, the replication engine 124 can replicate file system objects using file system requests made on the source and destination filers 102, 104. As such, the replication engine 124 can be implemented as part of or in addition to the source cache engine 132. Moreover, the operations implemented through the replication engine 124 can be performed asynchronously. Accordingly, the replication engine 124 can utilize or integrate replay logic 133.

The client requests 111 to the file system server 110 may request file system objects using a corresponding file system handle. In some embodiments, the identification of each file system object 113 in client requests 111 can be subjected to an additional identification process. More specifically, client requests 111 can identify file system objects 113 by file handles. However, the source filer 102 may export multiple volumes when the clients 101 are mounted, and some clients 101 may operate off of different export volumes. In such instances, a file system object can be identified by different file handles depending on the export volume, and different clients may have mounted to the source filer using different export volumes, so that multiple file handles can identify the same file system object. In order to resolve this ambiguity, data management system 100 utilizes an additional layer of identification in order to identify file system objects. In some embodiments, file system objects are correlated to object identifiers (OID) that are based in part on attributes of the requested object. An OID store 122 record OID nodes 131 for file handles (as described below), and further maintain tables which map file handles to OID nodes 131.

In an example of FIG. 1B, the file/object lookup 120 uses the OID store 122 to map the file handle 129 of a requested file system object to an object identifier (OID) node 131. Each OID node 131 can include an OID key 137 for a corresponding file system object, as well as state information 139 for that file system object. The state information 139 can correspond to metadata that is recorded in the OID store 122 for the particular object.

In one implementation, the OID key 137 for each file system object can be based on attributes for the file system object. For example, the OID key 137 can be determined from a concatenation of an identifier provided with the source filer 102, a volume identifier provided with the source filer, and other attributes of the object (e.g., a node number as determined from an attribute of the file system object). Accordingly, the properties that comprise the OID key 137 can be based at least in part on the file system object's attributes. Thus, if the file system server 110 has not previously identified a particular file system object, it will implement operations to acquire the necessary attributes in order to determine the OID key 137 for that file system object.

Once an OID node 131 is created, the file/object lookup 120 adds the OID node to the OID store 122. The OID store 122 can correspond to a table or other data structure that links the file handles of objects for given exports (or volumes) of the source filer 102 to OID keys 137, so that each OID key identifies a corresponding file system object.

File System Object Discovery

In one implementation, a system client ("walker 105") or process can be used to traverse the source filer 102 independently of other requests made by clients 101 in order to actively discover objects of the source filer 102. The walker 105 can issue file system operations that result in a traversal of the source filer 102, including operations that laterally and vertically traverse a hierarchy of file system objects maintained with the source filer 102.

In addition to fielding requests from the walker 105, file system server 110 can also process request 111 from the various clients that actively use the source filer 102. When a request is received that specifies a file system object 113, file system server 110 uses the file handle 129 of the requested file system object to check whether an object identifier (OID) exists for the specified file handle. The request for a given file system object 113 can originate from any of the clients 101 that utilize the source filer 102, including the walker 105. In one embodiment, the file system server 110 communicates the file handle 129 to the file/object lookup 120. The file/object lookup 120 references the file handle 129 to determine if a corresponding OID node 131 exists. If an OID node 131 exists for the file handle 129, then the assumption is made that the corresponding file system objects 113 in the source filer 102 has previously been processed for data migration to the destination filer 104.

If the file/object lookup 120 does not identify an OID node 131 for the file handle 129, then the attributes of the newly encountered object is acquired. One of the components of the data management system 100, such as the file system server 110 or replication engine 124, can issue a request 121 from the source filer 102 to obtain the attributes 123 of the newly discovered object. The request may be issued in advance of the file system server 110 forwarding the request to the source filer 102 for a response.

Replication Engine

In an embodiment, the file system server 110 processes individual file system requests 111, and determines the file handle 129 for each file system object. The OID store 122 can be maintained to store OID nodes 131 (for discovered objects) as tuples with corresponding file handles 129. When the file/object lookup 120 determines that no OID node 131 exists in the OID store 122 for a given file handle 129, then the replication engine 124 is triggered to replicate the corresponding file system object to the destination filer 104. Each node in the OID store 122 can further be associated with state information that records the state of the corresponding file system object relative to the source filer 102. In replicating the file system object, the replication engine 124 uses attributes of the replicated file system object so that the organizational structure of the portion of the source filer 102 where the replicated file system object is found is also maintained when replicated on the destination filer 104. In this way, the source filer 102 can be replicated with its organization structure and file system objects on the destination filer.

Additionally, as mentioned, an OID node is determined and added to the OID store 122. The entry into the OID store 122 can specify the OID node 131 of the new file system object, as well as state information as determined from the attributes of the corresponding file system object. In this way, the OID node 131 for the discovered file system object can be stored in association with the file handle 129 for the same object.

In one implementation, the replication engine 124 acquires the attributes 123 of the newly discovered file system object by issuing a file system attribute request 121 to the source filer 102. For example, in the NFS version 3 environment, the replication engine 124 can issue a "GetAttr" request to the source filer 102. In variations, other components or functionality can obtain the attributes for an unknown file system object.

Still further, in some variations, the source cache engine 132 can procure and cache the attributes of the source filer 102. When the attributes are acquired for a given OID node 131 (e.g., replication engine 124 issues GetAttr request), the request can made to the source cache engine 132, rather than to the source filer 102. This offloads some of the load required from the source filer 102 during the migration process.

The replication engine 124 can implement processes to replicate a file system object with the destination filer 104. As mentioned, the replication engine 124 can operate either asynchronously or synchronously. When operating asynchronously, replication engine 124 schedules operations (e.g., via replay logic 133) to create a newly discovered file system object with the destination filer 104. The asynchronous implementation can avoid latency and performance loss that might otherwise occur as a result of the data migration system 100 populating the destination filer 104 while processing client request for file system objects.

According to some embodiments, the replication engine 124 can replicate the corresponding file system object by performing a read operation on the source filer 102 for the newly discovered file system object, then triggering a create operation to the destination filer 104 (or the destination caching engine 118) in order to create the discovered file system object on the destination filer. Examples recognize, however, that the source filer 102 may inherently operate to process requests based on file handles, rather than alternative identifiers such as OIDs. Accordingly, in requesting the read operation from the source filer 102, the replication engine 124 specifies a file handle that locates the same file system object with the source filer. Furthermore, the file handle used by the issuing client may be export-specific, and each export may have a corresponding security policy. For the source filer 102 to correctly recognize the read operation from the replication engine 124, the replication engine 124 can be configured to utilize the file handle that is specific to the client that issued the original request. By using the file handle of requesting client, the security model in place for the client can be mirrored when the read/write operations are performed by the replication engine 124. In one implementation, the OID store 122 may include a reverse lookup that matches the OID key 137 of the newly identified file system object to the file handle to which the request for the file system object was made. In this way, components such as the replication engine 124 can issue requests from the source and destination filers 102, 104, using the appropriate file handles.

In one implementation, the replication engine 124 can communicate the file system object 135 that is to be created at the destination filer to the replay logic 133. In turn, the replay logic 133 schedules and then performs the operation by communicating the operation to the destination filer 104. Thus, from the newly discovered file system object 135, the replay logic 133 can replicate the file system object 155 at the destination filer 104. The replay logic 133 can, for example, issue a create operation 139 to replicate the file system object 135 at the destination filer 104. The replicated file system object 155 can be associated with the same file handle as the corresponding file system object 135 maintained at the source filer 102.

In response to the create operation 139, the destination filer 104 returns a response that includes information for determining the OID for the replicated file system object 155 at the destination. For example, the replication engine 124 can use the response 149 to create a destination OID node 151 for the replicated file system object 155. The destination OID node 151 can also be associated with the file handle of the corresponding object in the source filer 102, which can be determined by the replication engine 124 for the requesting client (and the requesting client-specific export of the source filer). As such, the destination OID node 151 of the replicated file system object 155 is different than that of the source OID node 131.

The destination OID store 152 can maintain the destination node OID 151 for each newly created file system object of the destination filer 104. The mapper 160 can operate to map the OID node 131 of source file system objects to the OID node 151 for the replicated object at the destination filer 104. Additionally, when the data migration has matured and the destination filer 104 is used to respond to clients that are mounted to the source filer 102, (i) the OID store 122 can map the file handle specified in the client request to an OID node 131 of the source filer 102, and (ii) the mapper 160 can map the OID node 131 of the source filer 102 to the OID node 151 of the destination filer 104. Among other uses, the mapping enables subsequent events to the file system object of the source filer 102 to be carried over and mirrored on the replicated file system object of the destination filer 104. Furthermore, based on the mapping between the OID nodes 131, 151, the determination can be made as to whether the requested file system object has been replicated at the destination filer 104.

Additionally, when the migration has progressed to the point that the destination filer 104 provides the responses to the client requests 111, the mapper 160 can translate the attributes of a file system object retrieved from the destination filer 104, so that the object appears to have the attributes of the corresponding object in the source filer 102. By masquerading attributes, the mapper 160 ensures responses from the destination filer 104 appear to originate from the source filer 102. This allows the clients to seamlessly be transitioned to the destination filer 104 without interruption.

In one variation, replication engine 124 triggers creation of the previously un-migrated file system object 135 in a cache resource that is linked to the destination filer 104. With reference to an example of FIG. 1, replication engine 124 triggers replication of file system object 135 to a destination cache engine 118, which carries a copy of the file system object in the destination filer 104.

In an embodiment, the replication engine 124 implements certain non-read type operations in a sequence that is dictated from the time the requests are made. In particular, those operations which are intended to affect the structure of the source filer 102 are recorded and replayed in order so that the organization structure of the destination filer 104 matches that of the source filer 102. In one implementation, the source cache 132 (or other component of the data migration system) records the time when a requested file system operation is received. The replay log 133 implements the timing sequence for queued file system operations. In this way, the dependencies of file system objects in the source filer 102 can be replicated on the destination filer 104. For example, operations specified from the clients 101 to create a directory on the source filer 102, then a file within the directory can be replicated in sequence so that the same directory and file are created on the destination filer, with the dependency (file within newly created directory) maintained.

File System Updates

In addition to replicating newly discovered file system objects, data management system 100 updates file system objects that have been replicated on the destination filer 104 with file system operations that are specified from clients 101 and directed to the source file system 102. The file system server 110 may signal the destination filer 104 the file system operations that alter objects of the source filer 102. Examples of such file system operations include those which are of type write, create, or delete. Read type operations, on the other hand, do not affect the objects of the source filer 102. When the request 111 from the clients 101 specify alteration operations (e.g., write, create, delete), the file system server 110 (i) determines the OID for the specified file system object(s), (ii) communicates the operation 117 with the OID to the source cache engine 132 (which as described below uses replay logic 133 to schedule performance of the operation at the destination filer 104), and (iii) forwards the operation to the source filer 102 (with the file system handle). The source filer 102 returns a response 127 to the file system server 110. The response 127 is communicated to the requesting client 101 in real-time, to maintain the transparent performance date of migration system 100. Accordingly, when the file system operation 119 is of a read type, it is forwarded to the source filer 102, and the corresponding response 127 is forwarded to clients 101.

The replay logic 133 operates to intelligently queue file system operations that alter the source filer for reply at the destination filer 104. By way of example, replay logic 133 can implement hierarchical rule-based logic in sequencing when file system operations are performed relative to other file system operations. For example, file system operations that designate the creation of a directory may be performed in advance of file system operations which write to that directory. As another example, the replay logic 133 can determine when two operations on the same file system object cancel one another out. For example, an operation to create a file system object can be canceled by an operation to delete the same object. If both operations are queued, the replay logic 133 may detect and eliminate the operations, rather than perform the operations. Still further, during the asynchronous destination population stage, the replay logic 133 can detect when a given operation affects a portion of the source filer 102 that has yet to be replicated. In such instances, the replay logic 133 can ignore the operation, pending replication of the portion of the source filer 102 that is affected by the file system operation.

The replay logic 133 can include logic that replays the queued file system operations 117 in an appropriate sequence, through the destination cache engine 118. For example, the destination cache engine 118 can maintain file system objects of the destination filer 104. The replay logic 133 may implement the operations 117 on the destination cache engine 118 in order to preserve performance from the destination filer 104 as it replicates the source filer 102. As a variation, the replay logic 133 can directly replay the file system operations at the destination filer 104. When the data management system operates in synchronous or bypass (see FIG. 2C) mode, the destination cache engine 118 further preserve system performance and transparency.

Additionally, the responses 127 to client requests 111 from the source filer 102 can be inspected by the file system server 110 for metadata 141, including timing attributes for file system objects. The metadata can be stored in the OID store 122 as part of each file object's OID node. Additionally, when requests are issued on the destination filer 104, the responses from the destination filer can be inspected by the replication engine 124, and attributes detected from the response can be stored with the corresponding destination OID node 151 in the destination OID store 152.

The mapper 160 can be used to link the OID nodes of the respective source and destination OID stores 122, 152, for purposes that include identifying destination objects specified in client requests to the source filer 102. Additionally, the mapper 160 can implement logic to compare attributes of corresponding OID nodes in order to determine whether, for example, the replicated object is up to date as compared the source object.

OOB Detection

Examples described herein recognize that the data migration system 100 should develop the destination filer 104 to be an accurate replication of the source filer 102, even in the presence of OOB events which circumvent the data migration system 100. For example, some implementations provide that while the data migration system 100 can operate to handle client requests 111 that are provided using NFS version 3 or 4, some client requests 109 can be issued through an alternative network protocol (e.g., FTP), and as such bypass the data migration system 100. Such client requests may be considered OOB in that the data migration system 100 does not directly learn of the client requests 113. In other implementations, OOB events can result from logical or physical manipulation of the source filer 102 by, for example, external events (e.g., administrator). Examples described herein provide that the data migration system 100 includes logic that learns of the change such OOB communications have on the source filer 102, when such events occur outside of the client requests 111 that are handled by the data migration system 100.

Figure 7A:
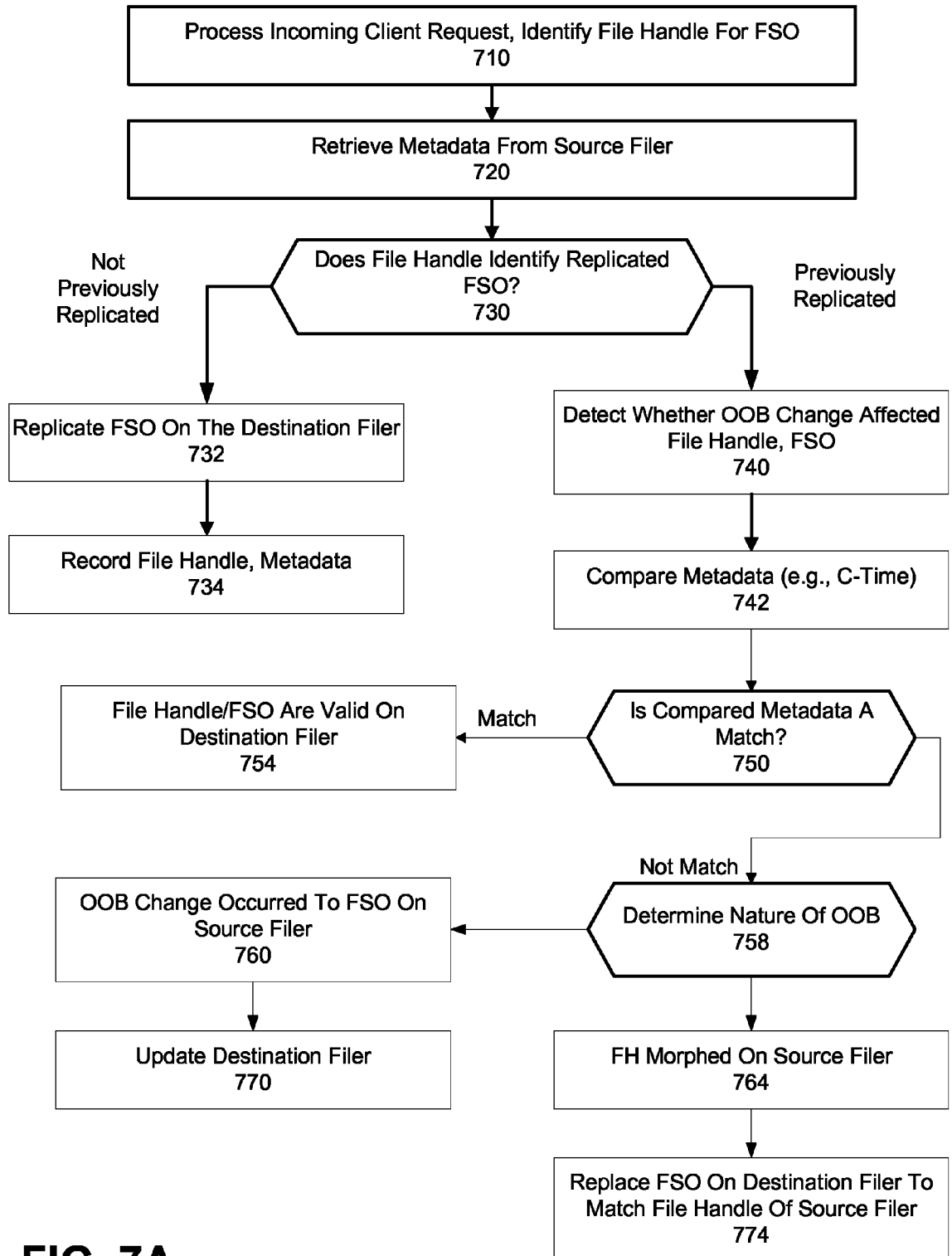
FIG. 7A illustrates a method for detecting and handling OOB events during an active data migration in which a source filer is replicated at a destination filer, according to one or more embodiments.
Figure 7B:
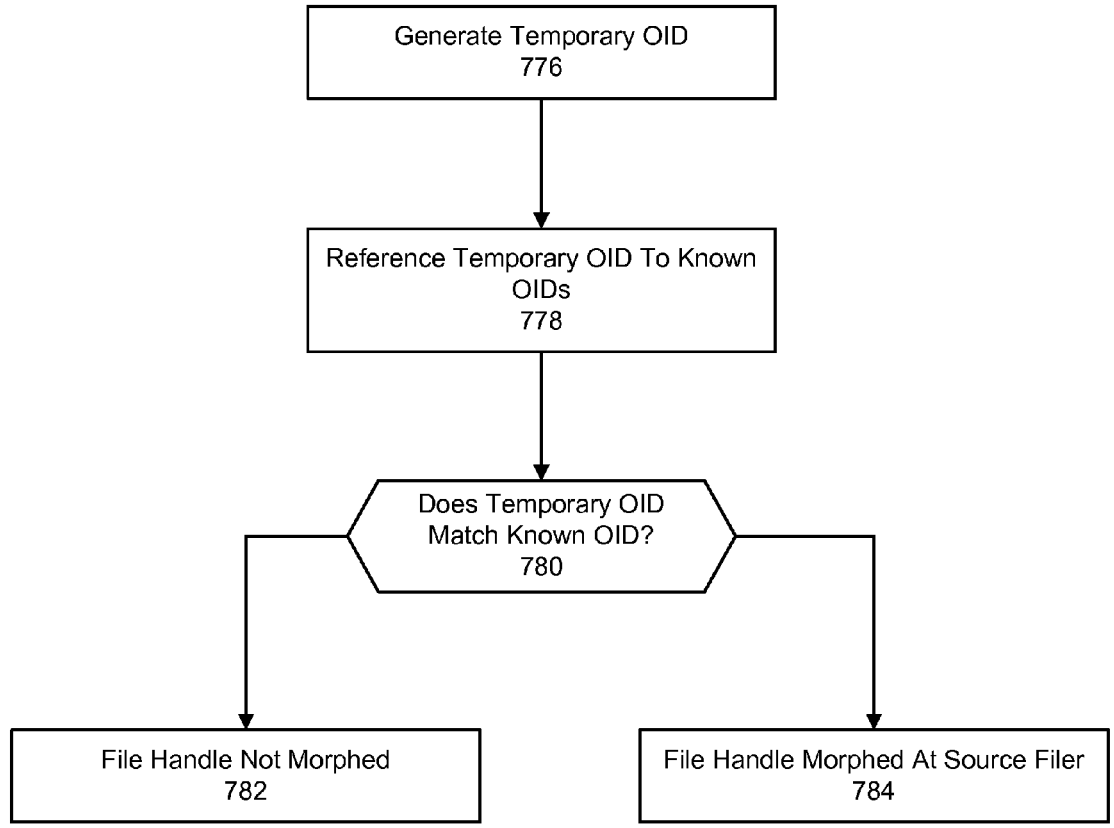
FIG. 7B illustrates a method for determining whether an out-of-band change resulted in a file handle being morphed, according to an embodiment.

In an example of FIG. 1B, file system server 110 includes OOB determination component 115. The OOB determination component 115 can perform operations to detect when replicated file system objects 155, stored in the destination filer 104 and/or destination cache engine 118, no longer match corresponding file system objects of the source filer 102. In one embodiment, the OOB determination component 115 processes individual client requests 111 to determine whether a specified file handle of the request corresponds to a file system object for which a corresponding replicated file system object exists. Furthermore, as described with an example of FIG. 7A and FIG. 7B, OOB determination component 115 uses metadata and attributes associated with the file system object as provided by source filer 102 at the time of the request, as well as with the file system object's replicated counterpart, in order to detect OOB events that have changed the source filer 102 with respect to the particular file system object. In more detail, FIG. 7A and FIG. 7B illustrates a method for detecting and handling OOB events that affect the destination filer 104 and/or destination cache engine.

Staged Migration

According to embodiments, data migration system 100 implements the migration of the source filer 102 in accordance with stages that affect the respective states of the source and destinations. FIG. 2A through FIG. 2E illustrate sequence diagrams that illustrate the stages of the data migration system 100.

Figure 2A:
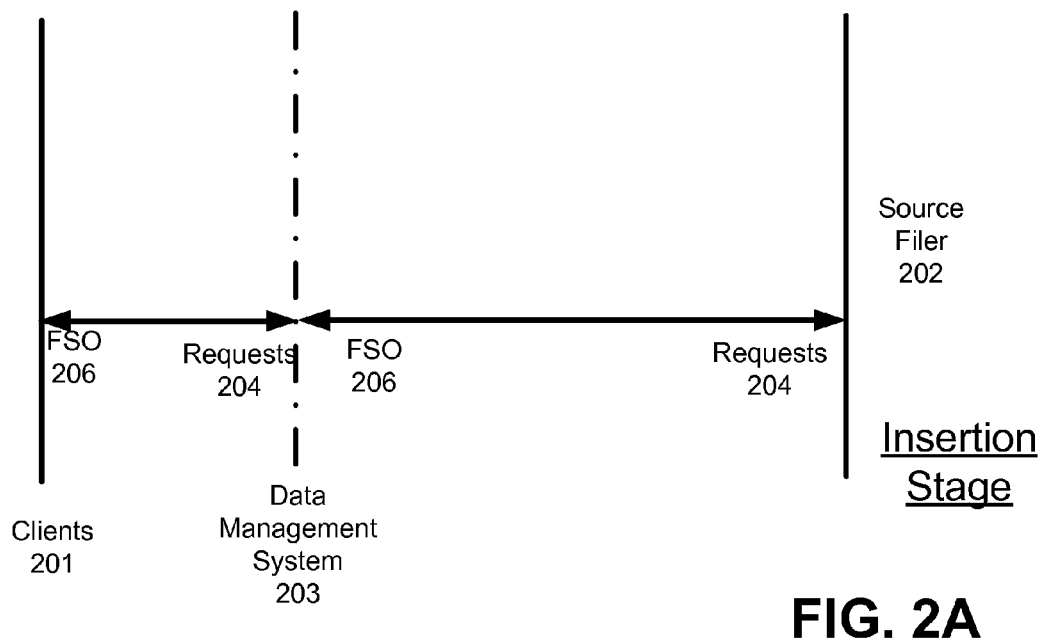
FIG. 2A through FIG. 2E illustrate sequence diagrams that illustrate the stages of the data migration system 100.

FIG. 2A illustrates an insertion stage for the data migration system 203. In the insertion phase, the data management system 203 is inserted in-line and transparently to intercept traffic as between a set of clients 201 and the source filer 202. The data management system can be configured to detect and process traffic bound for the IP address of the source filer 202. The IP addresses of the source filer 102 can be obtained programmatically or through input from an administrator in order to intercept incoming traffic without requiring clients to re-mount to the source filer 202.

By way of example, in an NFS environment, clients are programmed to reconnect to a mounted filer when a connection to the filer is terminated. The data migration system 203 can be inserted by terminating a client's existing connection with the source filer 202, then intercepting traffic to the source filer once the client attempts to re-set the network connection. The data migration system 203 then connects to the clients 201 and uses the IP address of the source filer in order to appear as the source filer. Once connected, the data migration system 203 acts as a proxy between the client and source filer. Clients 201 can issue requests 204 (e.g., NFS operations) for the source filer 202, which are intercepted and forwarded onto the source filer by the data migration system. The responses 206 can be received from the source filer 202 and then communicated to the requesting clients 201.

Figure 2B:
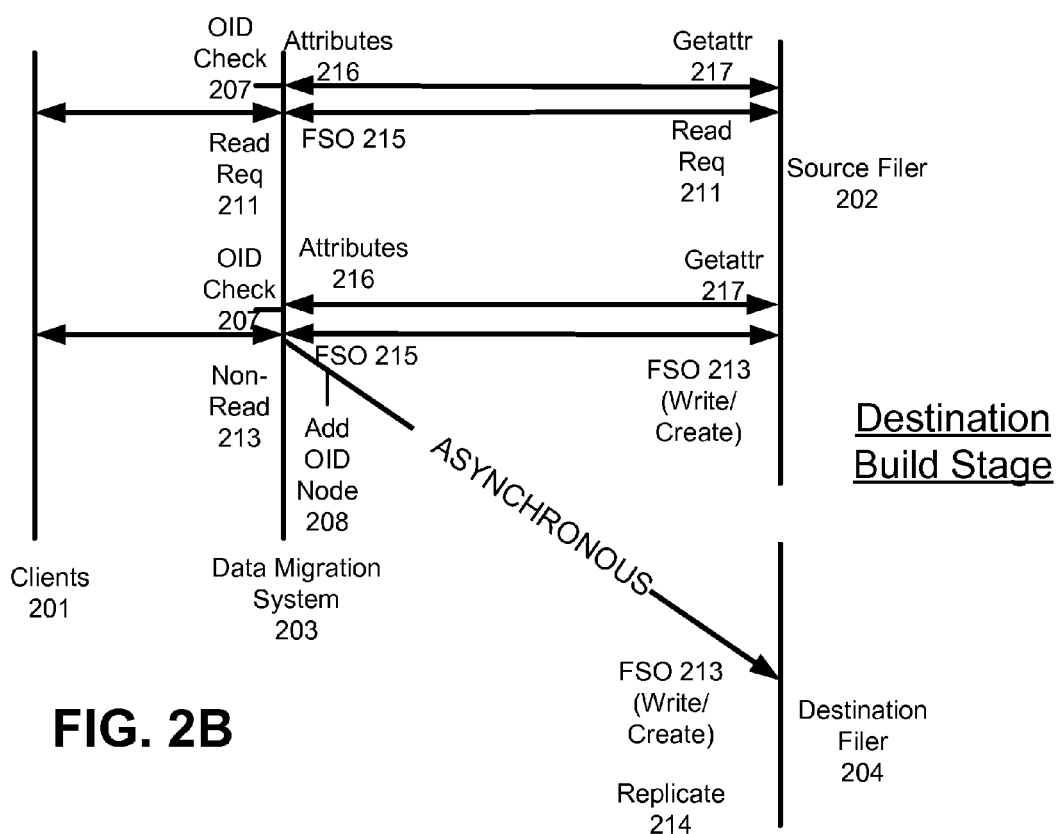

FIG. 2B illustrates a build stage during which the destination filer 104 is populated to include the file system objects of the source filer 102. In the build stage, clients 201 issue requests 211 (read type requests) and 213 (non-read type requests) specifying file system operations from the source filer 202. The source filer 202 uses the requests 211, 213 (which can include active discovery requests, such as issued from the walker 105) to determine the file system objects 215 that need to be created on the destination filer 204. In response to receiving requests 211, the data migration system 203 performs an OID check 207 to determine if the specified file system object 215 has previously been encountered (and thus migrated).

As noted in FIG. 1B, the OID check 207 can be implemented by the file/object lookup 120 which compares the file handle in the request with an OID store 122. If the specified file system object is known, then the file system object is not re-created at the destination filer 204. If the specified file system object is not known, then the data migration system 203 acquires the attributes 216 from the source filer 202 (e.g., "Getattr" request 217) and then creates 208 an OID node for the newly discovered object. With the OID node added, the object is replicated 214 at the destination filer 204. The replication of the object is performed asynchronously, using hardware such as cache resources which can queue and schedule the creation of the file system object with the destination filer 204.

While an example of FIG. 2B depicts the attribute request being made of the source filer 202, in some implementations, a caching resource (e.g., source cache engine 132) can cache the attributes of some or all of the file system objects on the source filer 202. As such, the attribute request 217 can be implemented as an internal request in which the data migration system 203 uses its internal cache resources to determine the attributes of a newly discovered file system object.

In addition to replication, file system requests 213 (e.g., write, create, or delete-type requests) which alter the source filer 202 are also scheduled for replay 219 on corresponding file system objects in the destination filer 204. The data migration system 203 may implement, for example, replay logic 133 to intelligently schedule and replay file system operations at the destination filer 204 that affect the contents of the source filer 202. Those operations which do not affect the contents of the source filer (e.g., read type operations 211) are forwarded to the source filer 202 without replay on the destination filer 204.

Figure 2C:
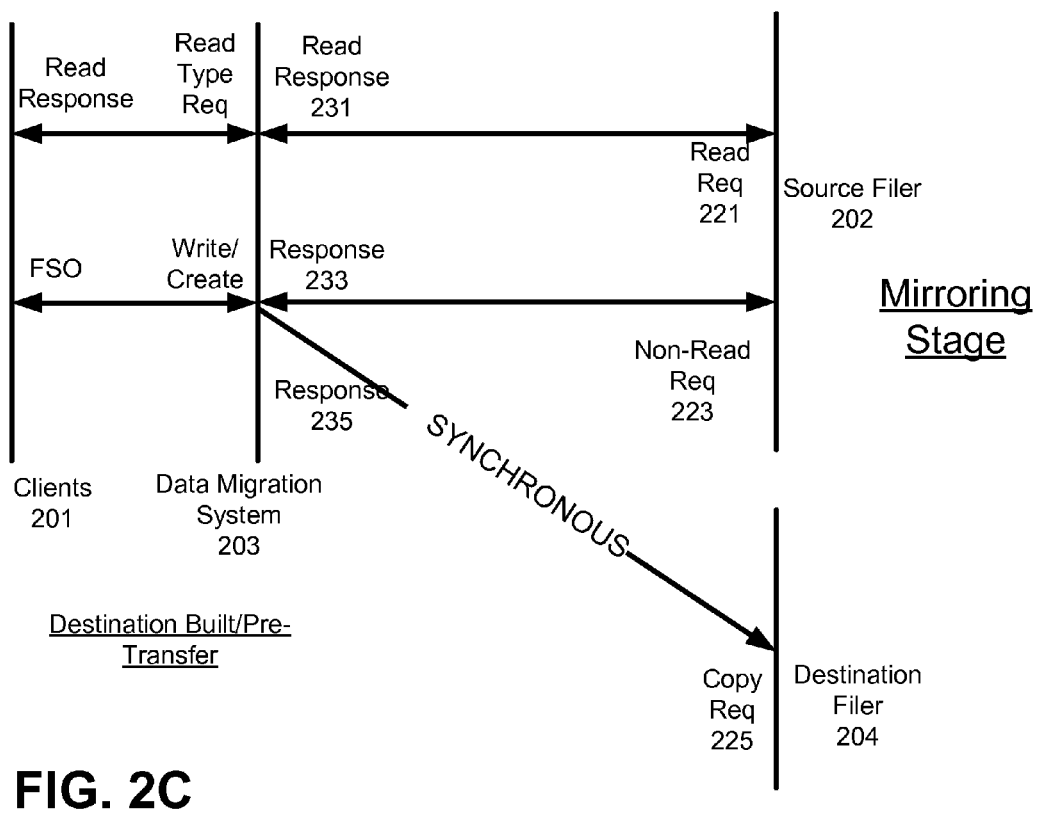

FIG. 2C illustrates a mirroring stage during which the destination filer is synchronously updated to mirror the source file system 202. The mirroring stage may follow the destination build stage (FIG. 2B), after when the source filer 202 and the destination filer 204 are deemed substantially equivalent. In one implementation, the mirroring state may be initiated by, for example, an administrator, upon a programmatic and/or manual determination that the source and destination filers are substantially equivalent. In this stage, when the clients 201 issue requests that alter the source filer 202, the data migration system 203 generates a corresponding and equivalent request to the destination filer 204. The request to the destination filer 204 can be generated in response to the incoming request, without the source filer 202 having first provided a response. Read-type requests 221 can be received by the data migration system 203 and forwarded to the source filer 202 without any mirroring operation on the destination filer 204. The response 231 to the read operation 221 are forwarded to clients 201. Other types of client-requested operations 223, which can affect the contents of the source filer 202 (e.g., write, delete, create) are copied 225 and forwarded to the destination filer 204. When the requests 223 are received, a copy of the request 225 is generated and communicated synchronously to the destination filer 104. The copy request 225 is signaled independently and in advance of the source filer 202 providing a response 233 to the request 223. A response 235 from the destination filer 204 can also be received for the copy request 225. As a result, both the source filer 202 and destination filer 204 provide a corresponding response 233, 235.

The data migration system 203 can forward the response 233 from the source filer 202 to the requesting client 201. However, if the response 233, 235 from the source and destination filers are inconsistent, failure safeguards can be implemented. For example, the destination file system 204 may be directed to re-replicate the file system object of the source filer 202. As an alternative or variation, the data management system 203 may revert to asynchronously updating the destination filer 204 until the inconsistency between the source and destination filers is deemed resolved.

Figure 2D:
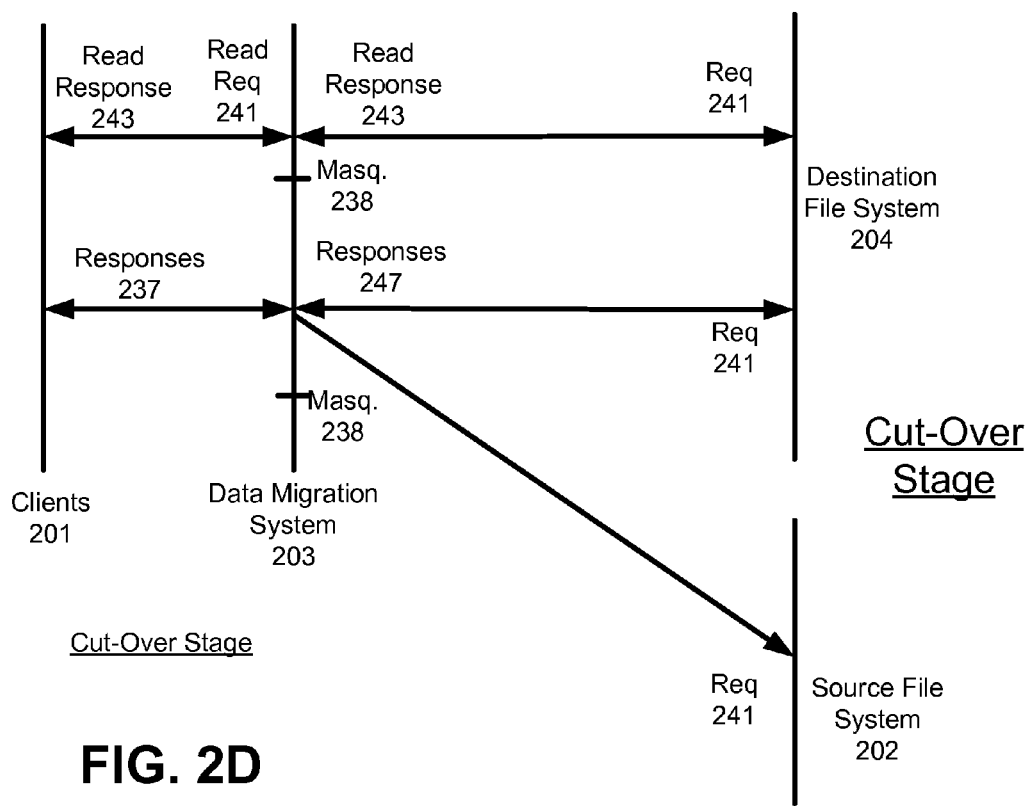

FIG. 2D illustrates a cut-over stage, when the destination filer 204 is used to handle client requests while the clients remain mounted to the source filer 202. As with the mirroring stage, the determination to enter the cut-over stage can be made programmatically and/or manually. In the cut-over stage, the clients 201 still operate to communicate with the source filer 202. However, the data migration system 203 operates to transparently forward the requests to the destination filer 204 for response, and also forwards the response from the destination filer to the clients 201. Thus, the data migration system 203 forwards the requests 241 to the destination filer 204, and not to the source filer 202. Responses 243 to the read-type requests 241 are forwarded from the destination filer 204 to the clients 201.

In the cut-over stage, clients 201 operate under the perception that they are communicating with the source filer 202. In order to maintain the operability of the clients, the data management system 203 operates to provide a programmatic appearance that the source filer 202 is in fact providing the response to the client requests. To maintain this appearance to the clients, the data management system 203 can masquerade the responses 233, 237 to appear as though the responses originate from the source filer 202, rather than the destination filer 204.

In some embodiments, the data migration system 203 implements masquerade operations 238 on responses that are being forwarded from the destination filer 204 to the clients 201. In some implementations such as provided by NFS environments, the clients 201 require responses 243, 247 to include attributes that map to the source filer 202, rather than the destination filer 204. Certain metadata, such as time metadata, alters as a result of the replication and/or use of the corresponding object with the destination filer 204. While the metadata on the destination filer 204 is updated, in order for the clients 201 to process the responses 243, 247, the metadata needs to reflect the metadata as provided on the source filer 202 (which the client understands). The data migration system 203 performs masquerade operations 238 which translate the metadata of the responses 243, 247 to reflect the metadata that would be provided for relevant file system objects as carried by the source filer 202. By way of example, M-time of a file system object changes if the data of the corresponding file system object changes. The fact that the file system object is returned from the destination filer 204 will mean that the file system object will have a different M-time than the source file system 202 if the file system object is not modified after it is migrated to the destination filer. In order to maintain the attributes of the responses 243, 247 consistent for clients 201, the data migration system 203 manipulates a set of attributes in providing the response to the client (e.g., masquerades the attributes). Specifically, the attributes specified in the response to the clients are re-written to match the attributes as would otherwise be provided from the source filer. Thus, for example, the data migration system 200 manipulates, in the response provided back to the client, the attribute received from the destination filer corresponding to the m-time so that it matches the m-time as would otherwise be provided from the source filer 202. Other attributes that can be manipulated in this manner include, for example, file identifier and file system identifier. With reference to FIG. 1B, the file system server 110 stores the attributes of file system objects as they are replicated and updated. For example, the file system server 110 can store current attributes by inspecting replies from the source filer 202, and storing the attributes of file system objects in their respective OID node 131.

In addition to manipulating attributes in the response (e.g., masquerading), data migration system 200 operates to confirm that when new objects are created on the destination filer 204, the file identifiers generated for the object are unique in the namespace of the source filer 202. In order to accomplish this, one embodiment provides that the data migration system 200 creates a file object (e.g., dummy) in the source filer 202. The source filer 202 then creates file identifier for the new object, and the data migration system 200 is able to use the identifier as created by the source filer to ensure the newly created object of the destination filer 204 is unique in the namespace of the source filer 202.

Figure 2E:
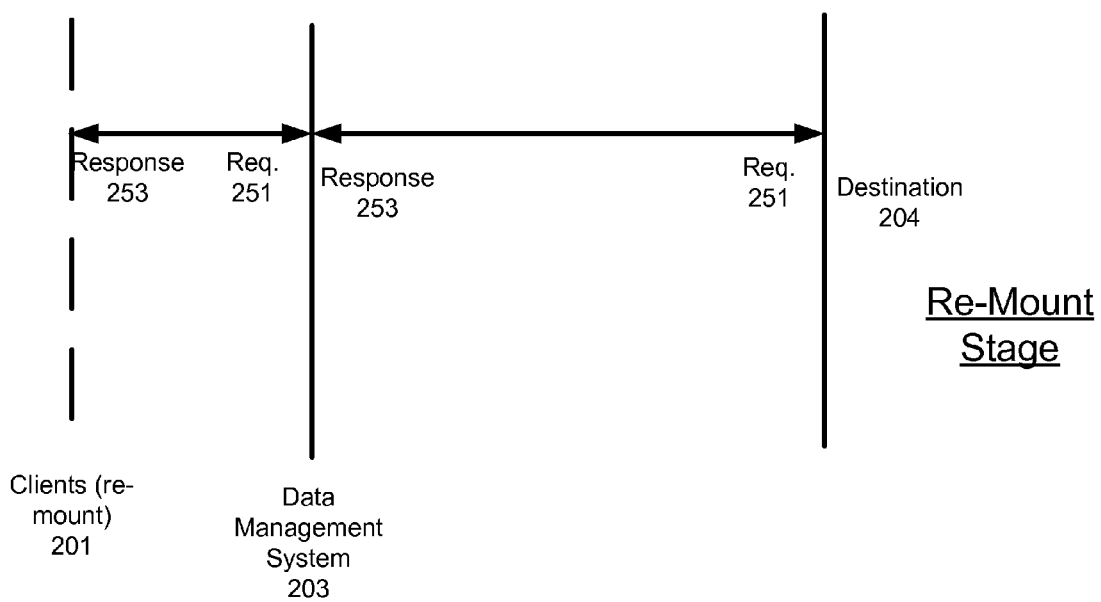

FIG. 2E illustrates re-mount state, when the clients re-mount to the destination filer. According to some embodiments, clients 201 can be re-mount at the destination filer 204 at the convenience of the administrator. Moreover, the administrator can remount the clients to the destination filer 204 in rolling fashion (e.g., one at a time) in order to ensure that any mishaps are isolated. When a client remounts, the destination filer 204 is exported for the client, and the client can use the destination filer with file handles and metadata that is specific to the destination filer 204. Exchanges 251, 253 between the clients 201 and the destination are conducted with the destination filer being the new source.

Methodology

Figure 3:
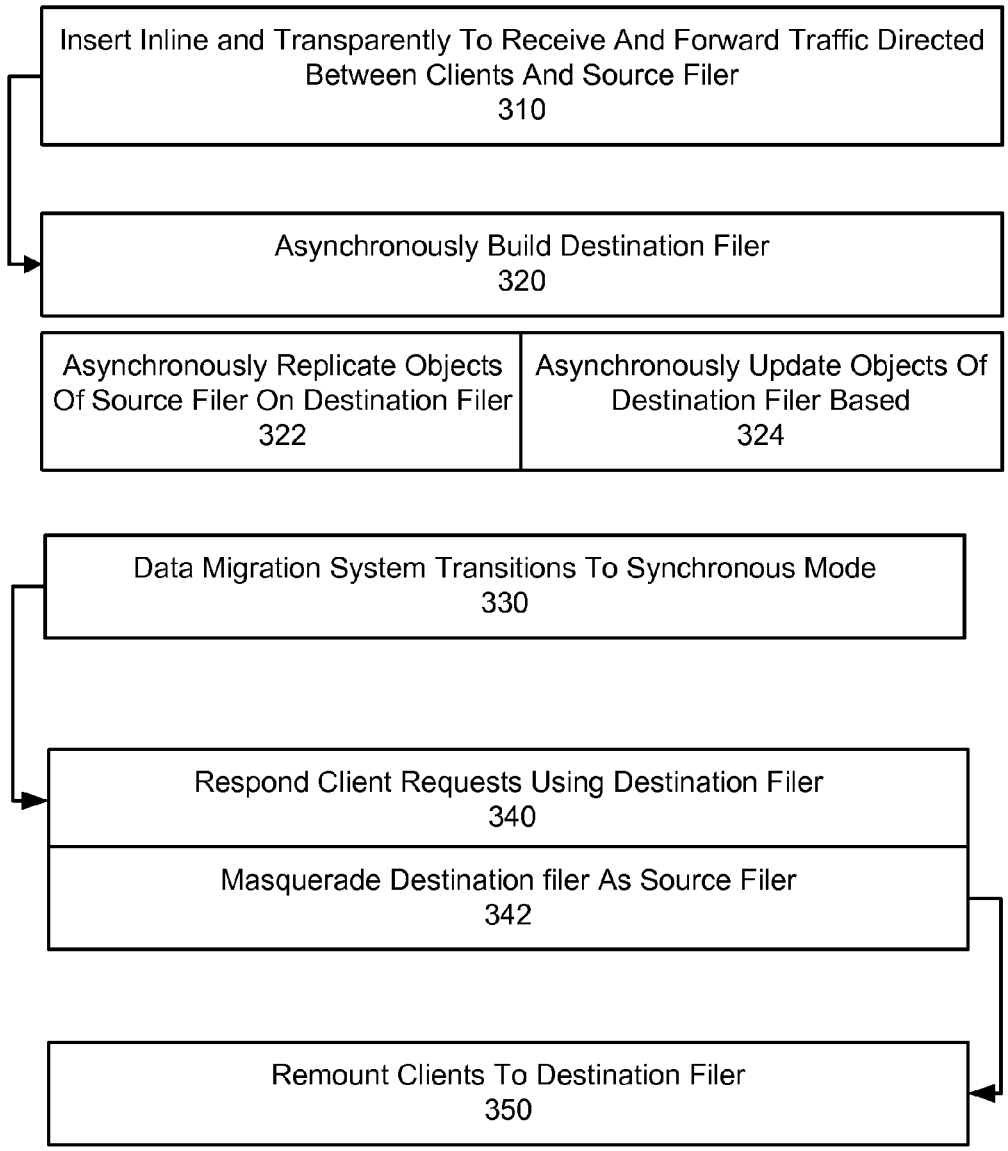
FIG. 3 illustrates a method for implementing a data migration system in stages to migrate a source file system without interruption of use to clients that use the source file system, according to an embodiment.
Figure 4:
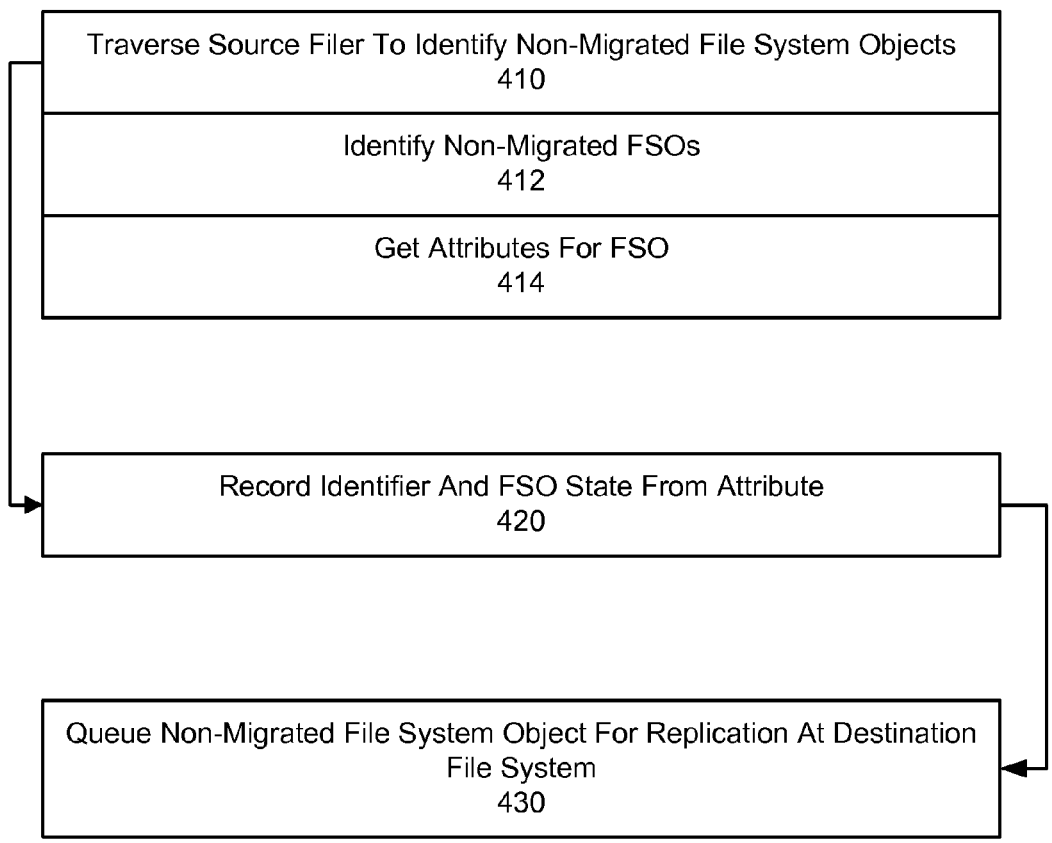
FIG. 4 illustrates a method for actively discovering and asynchronously replicating file system objects of a source file system while the source file system is in use, according to an embodiment.
Figure 5:
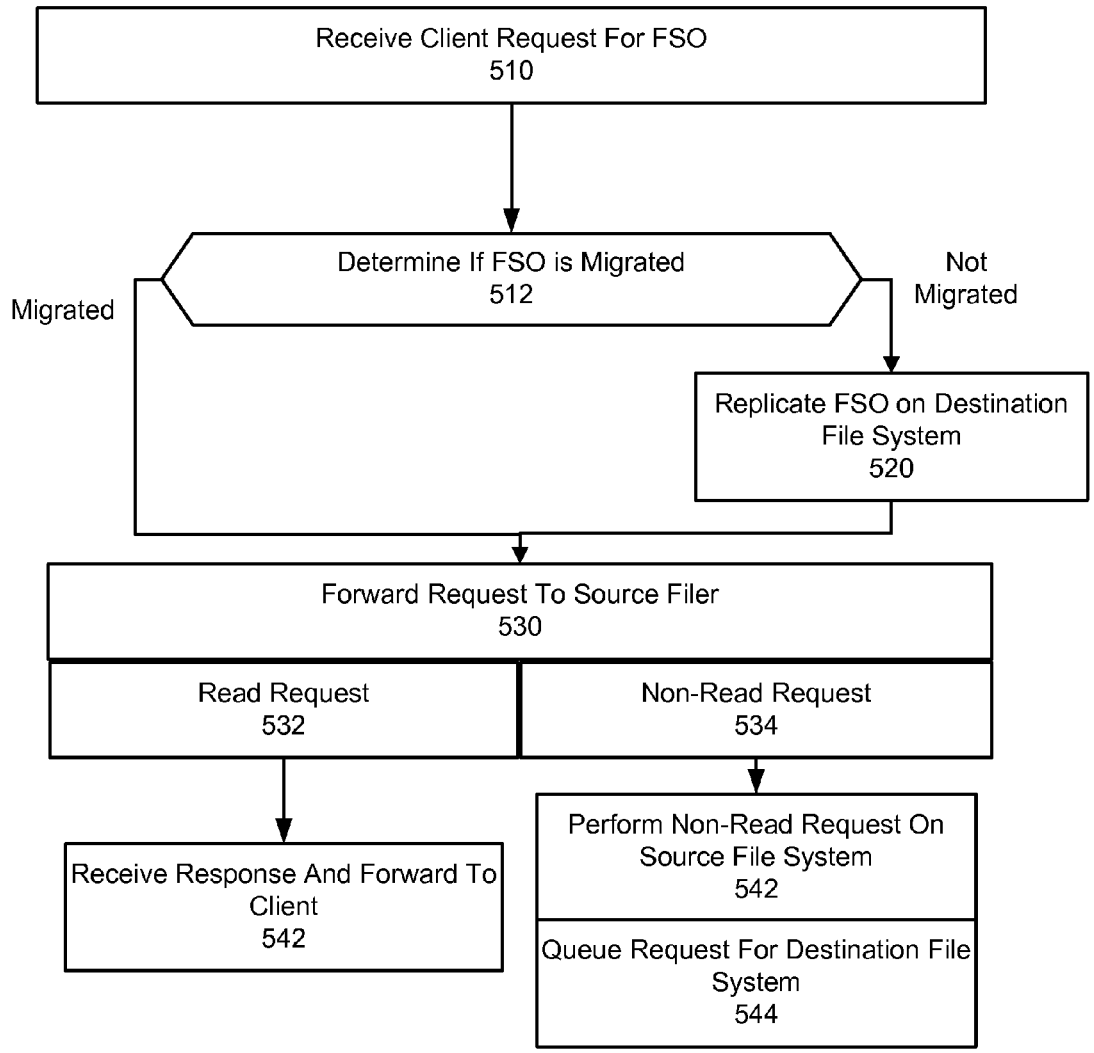
FIG. 5 illustrates a method for passively discovering and asynchronously replicating file system objects of a source file system while the source file system is in use, according to an embodiment.
Figure 6:
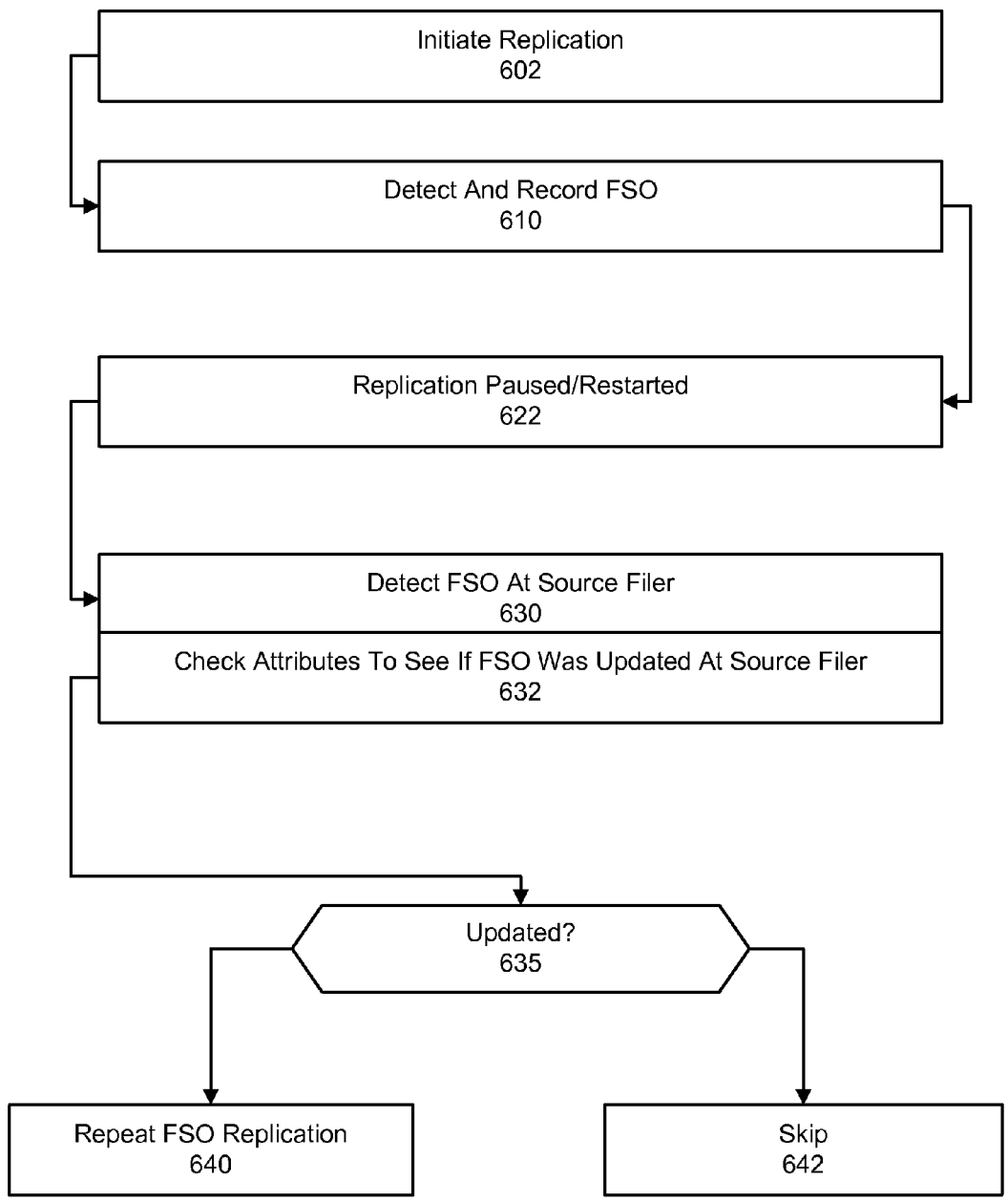
FIG. 6 illustrates a method for conducting a pause and restart in the data migration, according to an embodiment.

FIG. 3 illustrates a method for implementing a data migration system in stages to migrate a source filer without interruption of use to clients that use the source filer, according to an embodiment. FIG. 4 illustrates a method for actively discovering and asynchronously replicating file system objects of a source file system while the source file system is in use, according to an embodiment. FIG. 5 illustrates a method for passively discovering and asynchronously replicating file system objects of a source file system while the source file system is in use, according to an embodiment. FIG. 6 illustrates a method for conducting a pause and restart in the data migration, according to an embodiment. Examples such as described with FIG. 3 through FIG. 6 can be implemented using, for example, a system such as described with FIG. 1. Accordingly, reference may be made to elements of FIG. 1B for purpose of illustrating suitable elements or components for performing a step or sub-step being described.

With reference to FIG. 3, a data migration system is inserted in-line in the network path of clients that utilize the source filer (310). The insertion of the data migrate system 100 can be transparent, so that the use of the source filer by the clients is not interrupted. In particular, the data migration system replicates data from the source filer into a destination filer without requiring the clients of the source file or to unmount from the source filer. In one implementation, the data migration system 100 obtains the IP addresses of the source filer. The TCP network connection between the clients and the source filer 102 can be disconnected. When the clients attempt to reconnect to the source filer, the data migration system intercepts the communications to the source filer (e.g., intercepts traffic with the IP address of the source filer 102), and then proxies communications between the clients and the source filer.

Once the data migration system 100 is operational to intercept and proxy traffic between the clients and source filer 102, the data migration system asynchronously populates the destination filer 104 (320). This can include asynchronously replicating objects detected on the source filer 102 at the destination filer 104 (322). In one implementation, the file system objects of the source filer 102 are queued for replication at the destination filer 104.

In addition to replication, the source filer 102 can receive client requests that specify file system operations that modify the source filer 102 or its contents. In the asynchronous stage, file system operations that modify previously replicated objects of the source filer 102 are asynchronously replayed at the destination filer 104 (324), where they update the corresponding file system objects.

According to some embodiments, the data migration system can transition from asynchronously updating the destination filer 104 to synchronously updating the destination filer 104 (330). Some embodiments provide for a threshold or trigger for transitioning from asynchronous replication and update to synchronous updating of the source filer 102. For example, the transition from asynchronous to synchronous mode can occur when the source and destination filer's 102, 104 are deemed to be equivalent, such as at a particular snapshot in time. When synchronously updating, any client request that modifies the source filer 102 is immediately replayed on the destination filer 104. Thus, for example, a replay request is issued to the destination filer 104 in response to a corresponding client request for the source filer 102. The replay request can be issued to the destination filer independent of the response from the source filer 102 to the client request. Thus, the file system objects of the source filer 102 and destination filer 104 are synchronously created or updated in response to the same client request.

At some point when the destination filer 104 is complete (or near complete), the data migration system 100 switches and provides responses from the destination filer 104, rather than the source filer 102 (340). The client can still issue requests to the source filer 102. Read-type operations which do not modify file system objects can be responded to from the destination filer 104, without forwarding the request to the source filer 102. Other non-read type operations that modify file system objects or the filer can be forwarded to the destination filer 104 for response to the client.

According to some embodiments, the data migration system 100 masquerades responses from the destination file 104 as originating from the source filer 102 (342). More specifically, the data migration system 100 alters metadata or other attributes (e.g., timing attributes such as M-time) to reflect metadata of the corresponding file system object residing on the source filer 102, rather than the destination filer 104. This enables the client 101 to seamlessly process the response from the destination filer 104.

At a subsequent time, the data migration of the source filer 102 may be deemed complete. The clients can be unmounted from the source filer 102, and remounted to the destination filer 104 (350). The unmounting and remounting of the clients can occur in a rolling fashion, such as one at a time. This allows an administrator to reconfigure the clients to use the destination filer 104 with minimal disruption.

With reference to FIG. 4, asynchronous replication of the source filer 102 can include active identification of file system objects, which are then replicated on the destination file 104 (410). In one example, the source filer 102 is traversed to identify non-migrated file system objects (412). A traversal algorithm can be deployed, for example, to scan the file system objects of the source filer 102. The traversal algorithm can be implemented by, for example, a client-type process (e.g., client process provided on server) that issues requests to the source filer 102 for purpose of scanning the source filer. The attributes for individual file system objects can used to determine whether the particular file system object had previously been migrated to the destination filer 104. If the data migration system 100 has not acquired the attributes for a file system object, then the object may be deemed as being non-migrated or newly discovered. Once identified, the attribute for each such file system object is retrieved (414).

From the attribute, the identifier for the file system object is determined and recorded (420). The identifier can uniquely identify the file system object. A record of the file system object and its attributes can be made and stored in, for example, a corresponding lookup store. Additionally, the attributes of the file system object can be used to determine a state of the particular file system object.

The identified file system object can then be queued for replication at the destination file system 104 (430). For example, the replication engine 124 can schedule replication of the file system object at the destination filer 104.

With reference to FIG. 5, asynchronous replication of the source filer 102 can also include passive identification of file system objects, where file system objects are identified for replication from client communications that send requests (e.g., NFS type requests) to the source filer 102. In implementation, the data migration system receives client request for file system objects that reside on the source filer 102 (510). A determination is made as to whether the file system object has previously been migrated to the destination filer (512). As described with an example of FIG. 1, the determination may be based on the identifier of the file system object, which can be based in part on the attributes of the object. For example, an OID key can be determined for the file system object and then used to determine whether the object was previously migrated to the destination filer 104.

If the determination is that the object has previously been migrated, the client request is forwarded to the source filer 102 for a response (530). If, however, the determination is that the object has not previous been migrated, a sequence of operations may be queued and asynchronously implemented in which the file system object is replicated on the destination file system 104 (520). The asynchronous replication of the file system object enables the client requests to readily be forwarded to the source filer for response (530). If the forwarded request is a read-type request (532), a response is received from the source filer for the read request and forwarded to the client (542). If the forwarded request is a non-read type request that modifies are alters the source filer or its objects (534), then (i) the response is received from the source filer 102 and forwarded to the client (542), and (ii) the request from the client is queued for replay on a corresponding replicated file system object of the destination filer 104 (544).

In FIG. 6, data migration system 100 can be initiated to migrate data from the source filer to the destination filer. As mentioned with various embodiments, file system objects of the source filer 102 can be detected (e.g., actively or passively), and attributes for the detected file system objects are recorded (610). Additionally, the attributes of file system objects can be recorded from responses provided by the source filer to client requests (620).

While the data migration system is taking place, the data migration system 100 and can be paused for a period of time, then restarted (622). For example, an administrator may pause the data migration system 100 prior to the completion of the asynchronous build stage. When paused, the source filer 102 remains in active use, and clients can modify the contents of the source filer by adding, deleting or modifying file system objects of the source filer. When the data migration system returns online, the data migration system does not know what changes took place while it was paused. Rather to initiate the whole process over, again, the data migration system 100 can reinitiate active and/or passive file system object detection.

When a file system object of the source filer's detected (630), the attributes of the file system object can be checked to determine whether that particular file system object represents a modification to the source filer that occurred during the pause (632). Specific attributes that can be checked include timing parameters, such as modification time (M-time). The OID node 131 (see FIG. 1) for a given file system object can also include its attributes as recorded at a given time. In the response to the client request (whether active or passive), the attributes of the file system object can be inspected and compared against the recorded values. A determination can be made as to whether the values of the file system object indicate that the file system object had been updated during the pause (635). If the determination indicates that the file system object was updated, then the particular file system object is replicated again on the destination filer 104 (640). For example, the file system object can be queued by the replication engine 124 for replication at a scheduled time. If the determination indicates that the file system object was not updated, then no further re-replication is performed (642).

FIG. 7A illustrates a method for detecting and handling OOB events during an active data migration in which a source filer is replicated at a destination filer, according to one or more embodiments. FIG. 7B illustrates a method for determining whether an OOB change resulted in a file handle being morphed, according to an embodiment. A method such as described with FIG. 7A and FIG. 7B can be implemented using, for example, a system such as described with FIG. 1B. Accordingly, reference may be made to elements of FIG. 1B for purpose of illustrating suitable components for performing a step or sub-step being described.

In an example of FIG. 7A, an incoming client request 111 is received at the file system server 110, where the request is processed to identify a specified file handle for a requested file system object of the source filer (710). The file system server 110 issues a request to the source filer 102 to retrieve a metadata set associated with the file handle (720). Among other data items, the file system server 110 can include metadata such as the C-time and/or the M-time.

A determination is made as to whether the file handle specified in the client request 111 identifies a file system object that has previously been replicated (730). If the file handle is associated with a file system object that has not previously been replicated, then the file system server 110 initiates steps (732) to replicate the file system object on the destination filer. As part of the replication process, the metadata set for the file system object is recorded in association with the file handle, as well as the OID for the corresponding file system object (734). For example, the OID store 122 can associate each file handle with a metadata set for a corresponding file system object.

If, on the other hand, the file handle is associated with a file system object that has previously been replicated, then the OOB detection component 115 of the file system server 110 performs steps in order to see whether an OOB change affected the particular file system object (740). In performing the step, the OOB detection component 115 can compare metadata (which can be retrieved through performance of step 720) corresponding to time stamps, such as the C-time. In particular, one embodiment provides that a C-time is obtained in connection with a specified file handle as a result of the file system server 110 issuing, for example, a GetAttr request to the source filer 102. The retrieved metadata (e.g., C-time) is compared to recorded metadata for the file system object when the file system object was previously replicated (742).

A comparison can be made as to whether the compared metadata (e.g., C-time) is a match (750). If the compared metadata is a match, then the OOB determination component 115 can determine that file handle and the file system object of the request is valid, in that the file handle identifies a file system object on the source filer 102 which is accurately updated and reflected on the destination filer 104 (754).

If, on the other hand, the compared metadata is not a match, the OOB determination component 115 can determine the nature of the OOB change (758). Specifically, the OOB determination component 115 can determine whether the file handle of the request either (i) identifies a file system object which was updated on the source filer 102, but not on the destination filer 104 (760), and/or (ii) has morphed so that the file handle identifies a file system object on the source filer 102 that is different than what was previously identified when the particular file system object was replicated (764).

If OOB change corresponds to a file system object which was updated on the source filer 102, but not on the destination filer 104, then one or more remedial steps can be performed in order to update the destination filer 104 to accurately reflect the source filer 102 (770). The remedial steps can include, for example, re-replicating the file system object in question and/or updating the file system object in question in order to reflect the change from the OOB event.

If the OOB change corresponds to a file handle being morphed on the source filer 102 so as to point to a different file system object, then the identified file system object on the destination filer 104 can be removed, and replaced with the newly assigned file system object from the source filer (774). Thus, the file handle and the newly retrieved metadata can reference a different file system object in, for example, the OID store 126 and the destination filer 104. In order to determine whether the file handle has morphed on the source filer 102, the response from the source filer 102 can be analyzed in a manner described with FIG. 7B.

A method such as described with FIG. 7B can be implemented in, for example, determining the nature of the OOB change (see step 770 in FIG. 7A). With reference to FIG. 7B, the metadata of the response is used to generate a temporary OID at the file system server 110 (776). The temporary OID can be referenced against a list of OIDs maintained in the store 126 to determine whether the temporary OID matches a known OID and corresponding file system object (778). A determination can be made as to whether the temporary OID matches an OID that is known (e.g., previously generated and matched to file handle) (780). If the OID is associated with the file handle, then the OOB determination component 115 can determine no OOB event occurred (782). If the OID is not associated with the file handle, then the OOB determination component 115 can determine that an OOB event did actually occur (784).

A data migration system such as described with an example of FIG. 1B can utilize cache in order to enhance performance. In utilizing cache, embodiments recognize that cache coherency can be affected in the presence of out-of-band changes to the source filer. Embodiments such as described provided by a data migration system as described in FIG. 1 operate to maintain cache coherency in the face of out-of-band changes to the source filer 102. In particular, data migration system 100 supports deployment models in which the file system being cached is also accessed by clients and other sources through an out-of band (e.g., non-NFS such as CIFS or iSCSI). When OOB changes are detected to the source filer 102, corresponding cache elements can be invalidated, updated or replaced. Additionally, in a data migration context, additional action(s) may be taken (e.g. pause the migration or warn the user).

Furthermore, some embodiments provide for the data migration system to maximize throughput by selectively implementing file system operations received from the clients in parallel. However, the implementation of file system operations in parallel can cause cache incoherency when OOB events occur that change the source filer 102.

Figure 8:
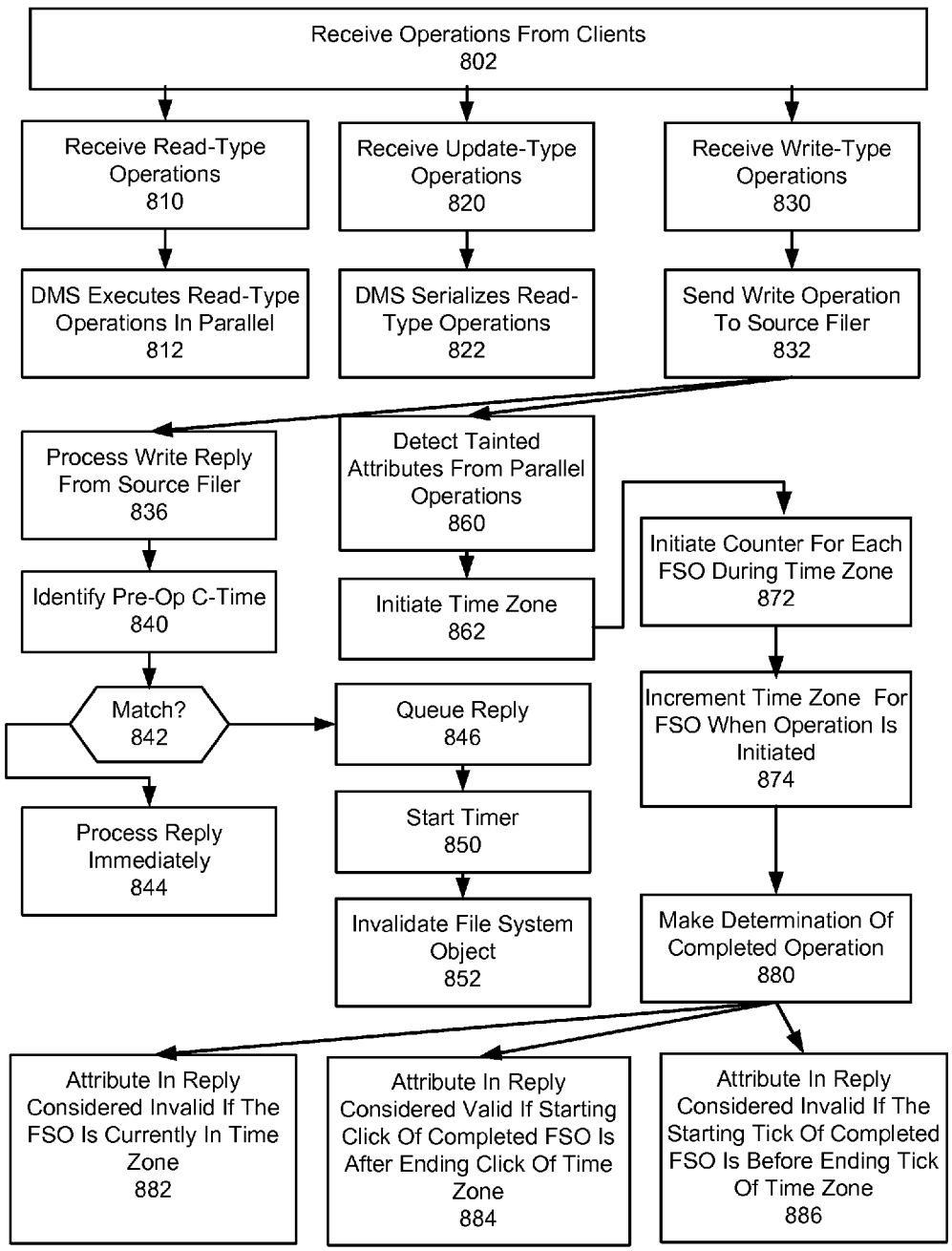
FIG. 8 illustrates an example method for detecting and accommodating out-of-band changes in order to maintain cache coherency during data migration.

FIG. 8 illustrates an example method for detecting and accommodating out-of-band changes in order to maintain cache coherency during data migration. A method such as described with 8 can be implemented using components such as described with an example of FIG. 8. Accordingly, reference may be made elements of FIG. 1B for purpose of illustrating suitable components for performing a step or sub-step being described.

With reference to FIG. 8, the data migration system 100 receives file system operations from clients 101 (802). The file system operations can be directed to the source filer 102, but intercepted by the data migration system 100 as part of a data migration session in which the source filer 102 is migrate to the destination filer.

The data migration system 100 processes read-type operations (810) in parallel (812). In the context of NFS, for example, read-type operations include READ, GETATTR, LOOKUP and ACCESS. By allowing parallel query operations for read-type operations, the data migration system 100 can obtain maximum throughput. As read-type operations do not change the attributes of the requested file system operations, no coherency issues arise with their parallel processing.

The data migration system 100 can also process update-type operations (820). The update-type operations alter the attributes of the specified file system operations. As such, the performance of the operations is serialized (822). The update-type operations are serialized in that the data migration system receives the operations, then sequences the operations in the order received before forwarding the operations onto the source filer 102. The response from the source filer 102 is then paired to the forwarded requests based on timing.

The data migration system 100 can process write-type operations in parallel (830). To enable maximum throughput of write-type operations, the data migration system 100 allows for non-overlapping write-type operations to be sent to the backend storage controller of the source filer 102 in parallel (832). However, embodiments recognize that a write-type request implicitly updates M-time and C-time attributes of a specified file system object.

In order to maintain cache coherency, the data migration system 100 operates to process the write replies (returned from the source filer 102) in the order that the corresponding operations were processed on the source filer 102 (836). Typically, for write-type operations, each write-reply typically returns two sets of file system attributes for each file system object: (i) A pre-operation attribute set, corresponding to the file system object's attribute just before the write was executed on the source filer; and (ii) a post-operation attribute set, corresponding to the file system attributes just before the write operation was executed on the source filer 102. The data migration system 100 sorts the write replies chronologically based on the pre-operation attribute time in order to ensure that they are processed in order.

When the data migration system 100 receives a write reply from the source filer 102, it identifies if the C-Time in the pre-operation attribute of the reply matches the C-Time of the cached attribute (840). If there is a match (842), then the reply is the next expected reply and it is processed immediately (844). If the pre-operation attribute does not match the expected value, then the reply is queued onto a sorted queue of pending replies, sorted chronologically by C-Time (846). The subsequent write replies can be inspected to determine whether any of them are the next expected reply. When the next expected reply is received, the queue of pending replies is walked through to determine if the next expected value is queued. The reply queue processing stops again once the processing thread arrives at a reply whose pre-operation C-time attribute does not match that for the next expected value at that instance.

In order to support the detection of out of band events, data migration system 100 implements a timer for each queued write reply (850). More specifically, each write reply is associated with an expiration time, indicating the maximum amount of time a queued reply will wait for reply processing. This expiration time can serve, for example, the following purposes: (i) the expiration timer limits the amount of additional latency that will be added to a write reply; and (ii) the expiration timer enables detection of an OOB event for the file system object. The expiration of the timer thus indicates the occurrence of an OOB event (852). For example, if an OOB event does occur on a file system object, it will cause a write reply to come back with an unexpected pre-operation C-time. The data migration system 100 can insert this reply with an unexpected pre-operation attribute in the reply queue and it will remain pending until the timer expires, indicating that it should be processed. This timer expiration will force the processing of this reply as an OOB event and the data migration system 100 can invalidate the file system object.

An embodiment further recognizes that another implication of processing writes in parallel with other operations is that the implicit attribute update of a write operation affects the attribute returned by query operations that were inflight at the same time as the write. For example, if a write request is sent to the source filer 102 in parallel with a read request, the controller of the source filer 102 may process the two operations in two different orders: (i) read before write, and (ii) write before read. In the read-before-write case, the attribute returned in the read reply will reflect the pre-write attribute. In the write-before-read case, the attribute returned in the read reply will reflect the post-write attribute. In either case, the data migration system 100 may be unable to use the attribute returned in the read reply to make a determination as to whether an OOB event occurred on the source filer 102. For example, unlike write replies, read-type operations do not separately return a pre-operation and post-operation set of attributes. Rather, such operations only return a single attribute.

According to some embodiments, the data migration system 100 can operate to guard against any tainted attribute returned by a query operation that was potentially affected by a parallel write (860). In one embodiment, a time period ("time zone") is initiated for a file system object when a write operation is requested from a client 101, but not completed (i.e., "inflight") (862). For a given file system object, a time zone begins when the data migration system 100 transitions from having no write operations in flight to having one or more write operations in flight. The time zone completes once all inflight write operations for the file system object have been processed.

In an embodiment, the data migration system 100 determines which query operations for a given file system object were inflight (initiated, but not yet processed) during the time zone for that file system object. For each operation, a counter is initiated when the time zone is present (872). Furthermore, the time zone is incremented for each operation that starts or completes on the object (874). Each request sent to the controller is stamped with a starting tick and each reply received is stamped with and end tick. Additionally, each object tracks the start and end tick of its current dynamic attribute zone.

Using this information, data migration system 100 determines when a completed operation was in transit during the time zone (880). The following may result from the determination: (i) If the file system object is currently in the time zone, the attribute in the reply is considered invalid (882); (ii) if the starting tick of the completed operation is after the ending tick of the last time zone, the attribute in the reply is considered valid (884); (iii) if the starting tick of the completed operation is before the ending tick of the last zone, the attribute is considered invalid (886). Any attributes from query replies declared as invalid are not used for OOB detection. Thus, the OOB detection is performed using attributes deemed valid (890).

Computer System

Figure 9:
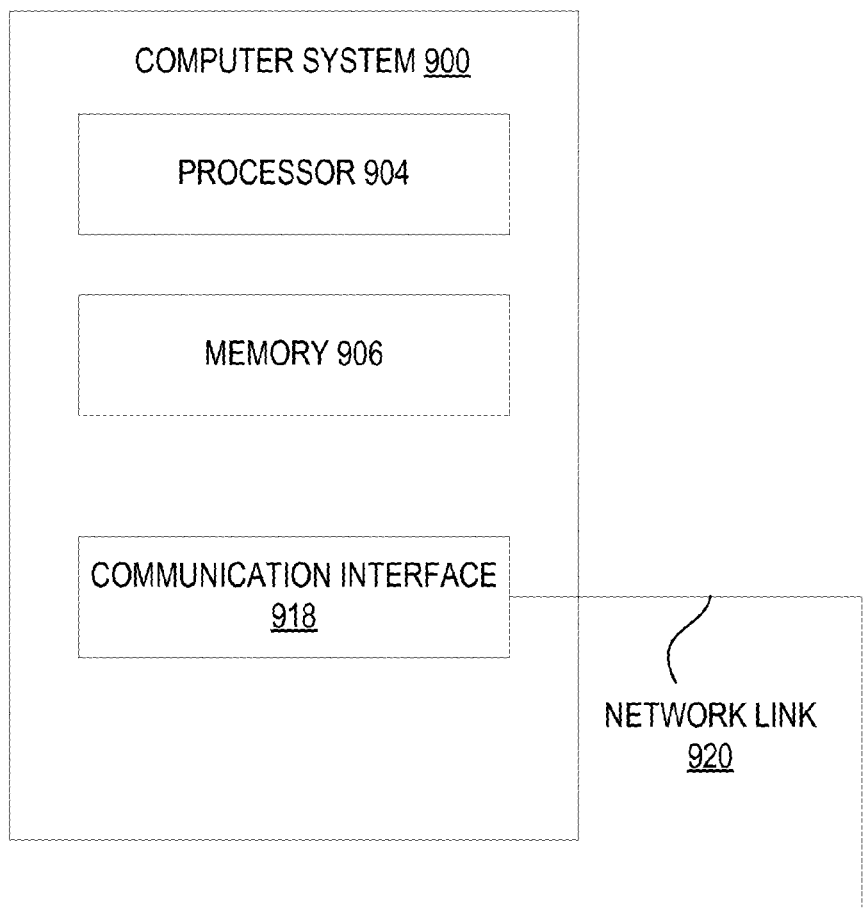
FIG. 9 is a block diagram that illustrates a computer system upon which embodiments described herein may be implemented.

FIG. 9 is a block diagram that illustrates a computer system upon which embodiments described herein may be implemented. For example, in the context of FIG. 1B and FIG. 2A through 2E, data migration system 100 (or 203) may be implemented using one or more computer systems such as described by FIG. 9. In the context of FIG. 1A, the server 20 can also be implemented using one or more computer systems such as described with FIG. 9. Still further, methods such as described with FIG. 3, FIG. 4, FIG. 5 and FIG. 6 can be implemented using a computer such as described with an example of FIG. 9.

In an embodiment, computer system 900 includes processor 904, memory 906 (including non-transitory memory), storage device 910, and communication interface 919. Computer system 900 includes at least one processor 904 for processing information. Computer system 900 also includes a main memory 906, such as a random access memory (RAM) or other dynamic storage device, for storing information and instructions to be executed by processor 904. Main memory 906 also may be used for storing temporary variables or other intermediate information during execution of instructions to be executed by processor 904. Computer system 900 may also include a read only memory (ROM) or other static storage device for storing static information and instructions for processor 904. A storage device 910, such as a magnetic disk or optical disk, is provided for storing information and instructions. The communication interface 918 may enable the computer system 900 to communicate with one or more networks through use of the network link 720 (wireless or wireline).

In one implementation, memory 906 may store instructions for implementing functionality such as described with an example of FIG. 1A, FIG. 1B, FIG. 2A through FIG. 2E, or implemented through an example method such as described with FIG. 3 through FIG. 6. Likewise, the processor 904 may execute the instructions in providing functionality as described with FIG. 1A, FIG. 1B, FIG. 2A through FIG. 2E, or performing operations as described with an example method of FIG. 3, FIG. 4, FIG. 5 or FIG. 6.

Embodiments described herein are related to the use of computer system 900 for implementing the techniques described herein. According to one embodiment, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for replicating changes, the method being implemented by one or more processors that are external to a source file system, the method comprising:
   replicating at least a portion of the source file system on a target memory while a plurality of clients utilize the source file system;
   generating an object identifier for each file system object that is replicated in the target memory, the object identifiers being based at least in part on metadata provided with each file system object in the source file system;
   storing the object identifier, for each file system object that is replicated, in association with a corresponding file handle; and
   handling requests from individual clients in the plurality of clients for file system objects of the source file system;
   wherein handling requests includes:
      receiving a given request that specifies a file handle;
      retrieving, from the source file system, a set of metadata associated with the specified file handle;
      determining, from the set of metadata, that the file handle identifies a first file system object on the source file system and a second file system object on the target memory by (i) generating an object identifier from the retrieved set of metadata, and (ii) determining that the generated object identifier does not match one of the stored object identifiers; and
      updating the target memory so that the specified file handle identifies the first file system object.

2. The method of claim 1, wherein determining includes comparing a time stamp in the set of metadata with a corresponding time stamp associated with the file handle in the target memory.

3. The method of claim 1, wherein the target memory corresponds to a cache.

4. The method of claim 1, wherein the target memory corresponds to a destination file system, and wherein replicating at least the portion of the source file system includes replicating the source file system on the destination file system while the source file system is in use by the plurality of clients.

5. A system positioned in-line between a plurality of clients and a source file system, the system comprising:
a memory resource to store instructions;
one or more processors using the instructions stored in the memory resource to:
replicate at least a portion of the source file system on a target memory while the plurality of clients utilize the source file system;
generate an object identifier for each file system object that is replicated in the target memory, the object identifiers being based at least in part on metadata provided with each file system object in the source file system;
store the object identifier, for each file system object that is replicated, in association with a corresponding file handle; and
handle requests from individual clients in the plurality of clients for file system objects of the source file system;
wherein handling requests includes:
receiving a given request that specifies a file handle;
retrieving, from the source file system, a set of metadata associated with the specified file handle;
determining, from the set of metadata, that the file handle identifies a first file system object on the source file system and a second file system object on the target memory by (i) generating an object identifier from the retrieved set of metadata, and (ii) determining that the generated object identifier does not match one of the stored object identifiers; and
updating the target memory so that the specified file handle identifies the first file system object.

6. The system of claim 5, wherein determining includes comparing a time stamp in the set of metadata with a corresponding time stamp associated with the file handle in the target memory.

7. The system of claim 5, wherein the target memory corresponds to a cache.

8. The system of claim 5, wherein the target memory corresponds to a destination file system, and wherein replicating at least the portion of the source file system includes replicating the source file system on the destination file system while the source file system is in use by the plurality of clients.

9. A non-transitory computer-readable medium that stores instructions, executable by one or more processors, to cause the one or more processors to perform operations that comprise:
replicating at least a portion of a source file system on a target memory while a plurality of clients utilize the source file system;
generating an object identifier for each file system object that is replicated in the target memory, the object identifiers being based at least in part on metadata provided with each file system object in the source file system;
storing the object identifier, for each file system object that is replicated, in association with a corresponding file handle; and
handling requests from individual clients in the plurality of clients for file system objects of the source file system;
wherein handling requests includes:
receiving a given request that specifies a file handle;
retrieving, from the source file system, a set of metadata associated with the specified file handle;
determining, from the set of metadata, that the file handle identifies a first file system object on the source file system and a second file system object on the target memory by (i) generating an object identifier from the retrieved set of metadata, and (ii) determining that the generated object identifier does not match one of the stored object identifiers; and
updating the target memory so that the specified file handle identifies the first file system object.

10. The non-transitory computer-readable medium of claim 9, wherein determining includes comparing a time stamp in the set of metadata with a corresponding time stamp associated with the file handle in the target memory.

11. The non-transitory computer-readable medium of claim 9, wherein the target memory corresponds to a cache.

12. The non-transitory computer-readable medium of claim 9, wherein the target memory corresponds to a destination file system, and wherein replicating at least the portion of the source file system includes replicating the source file system on the destination file system while the source file system is in use by the plurality of clients.

* * * * *